(12) United States Patent
Watanabe et al.

(10) Patent No.: US 8,007,027 B2
(45) Date of Patent: *Aug. 30, 2011

(54) DOOR OPERATING APPARATUS, ELECTROMAGNETIC CLUTCH, AND COUPLING MECHANISM

(75) Inventors: Hirofumi Watanabe, Yamanashi (JP); Takuya Kakumae, Yamanashi (JP)

(73) Assignee: Mitsui Mining & Smelting Co., Ltd., Kanagawa (JP)

( * ) Notice: Subject to any disclaimer, the term of this patent is extended or adjusted under 35 U.S.C. 154(b) by 192 days.

This patent is subject to a terminal disclaimer.

(21) Appl. No.: 12/389,208

(22) Filed: Feb. 19, 2009

(65) Prior Publication Data

US 2009/0151260 A1 Jun. 18, 2009

Related U.S. Application Data

(60) Continuation of application No. 11/782,904, filed on Jul. 25, 2007, now abandoned, which is a division of application No. 11/119,855, filed on May 3, 2005, now Pat. No. 7,429,073.

(30) Foreign Application Priority Data

| May 10, 2004 | (JP) | 2004-140256 |
| May 10, 2004 | (JP) | 2004-140257 |
| May 10, 2004 | (JP) | 2004-140258 |
| May 10, 2004 | (JP) | 2004-140259 |

(51) Int. Cl.
*B60J 5/00* (2006.01)
(52) U.S. Cl. .......... 296/146.4; 296/56; 49/340
(58) Field of Classification Search .......... 296/56, 296/146.4; 49/339, 340, 342, 341; 192/48.2; 403/121, 122, 132, 141, 144
See application file for complete search history.

(56) References Cited

U.S. PATENT DOCUMENTS

| 422,914 A | 3/1890 | Casto |
| 1,908,789 A | 5/1933 | Ragan |
| 3,129,023 A | 4/1964 | Fierstine |
| 3,250,557 A | 5/1966 | Ulderup |
| 3,641,448 A | 2/1972 | Steckler |
| 3,862,807 A | 1/1975 | Doden et al. |
| 4,083,545 A | 4/1978 | Herbenar |
| 4,435,101 A | 3/1984 | Sugiyama et al. |
| 4,530,185 A | 7/1985 | Moriya et al. |
| 4,666,330 A | 5/1987 | O'Connell |
| 5,531,498 A | 7/1996 | Kowall |
| 6,055,776 A | 5/2000 | Dettling et al. |

(Continued)

FOREIGN PATENT DOCUMENTS

DE 337220 5/1921

(Continued)

*Primary Examiner* — Jason S Morrow
(74) *Attorney, Agent, or Firm* — Sughrue Mion, PLLC

(57) ABSTRACT

A door operating apparatus includes a motor bracket that covers a driving shaft of a driving motor; an output shaft that is disposed from the motor bracket toward the supporting bracket so as to be orthogonal to an extending direction of the driving shaft; a first rotational element that is linked with the driving shaft, and disposed on the output shaft; a second rotational element that is linked with a door operating mechanism, and disposed between the first rotational element and the supporting bracket on the output shaft; and a clutch unit including a clutch driving section that supports a rotation of the output shaft. When the first rotational element and the second rotational element are engaged by driving of the clutch driving section, the door operating mechanism is actuated by the driving force.

7 Claims, 20 Drawing Sheets

U.S. PATENT DOCUMENTS

| | | | |
|---|---|---|---|
| 6,092,336 | A | 7/2000 | Wright |
| 6,270,147 | B1 | 8/2001 | Butler et al. |
| 6,367,199 | B2 | 4/2002 | Sediak et al. |
| 6,408,573 | B1 | 6/2002 | Fukumoto |
| 6,420,843 | B1 | 7/2002 | Pohl |
| 6,601,903 | B2 | 8/2003 | Nakagome |
| 6,618,997 | B2 | 9/2003 | Yokomori |
| 6,767,048 | B2 | 7/2004 | Yokota |
| 7,063,373 | B2 | 6/2006 | Chikata et al. |
| 7,156,447 | B2 * | 1/2007 | Watanabe ............ 296/146.4 |
| 7,370,905 | B2 * | 5/2008 | Watanabe ............ 296/146.4 |
| 7,429,073 | B2 | 9/2008 | Watanabe et al. |
| 7,808,197 | B2 * | 10/2010 | Kimura et al. ............ 318/469 |
| 2003/0106757 | A1 | 6/2003 | Johnson et al. |
| 2004/0046401 | A1 * | 3/2004 | Watanabe ............... 292/262 |
| 2004/0046418 | A1 | 3/2004 | Chikata et al. |
| 2005/0082870 | A1 | 4/2005 | Chikata et al. |
| 2005/0253414 | A1 | 11/2005 | Yokomori |
| 2006/0112643 | A1 | 6/2006 | Yokomori et al. |
| 2006/0137251 | A1 | 6/2006 | Imai et al. |
| 2007/0051046 | A1 * | 3/2007 | Yoshida ..................... 49/345 |
| 2009/0097908 | A1 * | 4/2009 | Asa et al. .................. 403/122 |
| 2010/0007170 | A1 * | 1/2010 | Etou et al. ............... 296/146.4 |

FOREIGN PATENT DOCUMENTS

| | | | |
|---|---|---|---|
| DE | 27 39 250 | C2 | 3/1978 |
| DE | 199 37 222 | C2 | 3/2001 |
| DE | 102 29 305 | A1 | 2/2003 |
| DE | 698 14 873 | T2 | 5/2003 |
| EP | 0 078 139 | A3 | 5/1983 |
| EP | 0 078 662 | A3 | 5/1983 |
| EP | 1 157 182 | B1 | 8/2003 |
| EP | 1 471 200 | A2 | 10/2004 |
| GB | 278345 | A | 5/1928 |
| GB | 357803 | A | 10/1937 |
| GB | 595598 | A | 12/1947 |
| GB | 753234 | A | 7/1956 |
| GB | 804955 | A | 11/1958 |
| GB | 987803 | A | 3/1965 |
| GB | 2 322 670 | A | 9/1998 |
| GB | 2 334 069 | A | 8/1999 |
| GB | 2372070 | A | 8/2002 |
| GB | 2 391 048 | A | 1/2004 |
| JP | 48-031167 | | 9/1973 |
| JP | 53-077947 | A | 7/1978 |
| JP | 58-160825 | U | 10/1983 |
| JP | 58-187612 | U | 12/1983 |
| JP | 60-028635 | U | 2/1985 |
| JP | 2-033933 | U | 3/1990 |
| JP | 08-291830 | A | 11/1996 |
| JP | 10-252783 | A | 9/1998 |
| JP | 11-026131 | A | 1/1999 |
| JP | 11-036703 | A | 2/1999 |
| JP | 11-324482 | A | 11/1999 |
| JP | 2000-179233 | A | 6/2000 |
| JP | 2000-227305 | A | 8/2000 |
| JP | 2001-128407 | A | 5/2001 |
| JP | 2001-132327 | A | 5/2001 |
| JP | 2001-193353 | A | 7/2001 |
| JP | 2001-123740 | A | 8/2001 |
| JP | 2002-195296 | A | 7/2002 |
| JP | 2002-201854 | A | 7/2002 |
| JP | 2003-074254 | A | 3/2003 |
| JP | 2003-74255 | A | 3/2003 |
| JP | 2003-278442 | A | 10/2003 |
| JP | 2003-336441 | A | 11/2003 |
| JP | 2004-44368 | A | 2/2004 |
| JP | 2004-098795 | A | 4/2004 |
| JP | 2005-506498 | A | 3/2005 |
| JP | 2005-529260 | A | 9/2005 |
| WO | 03/036119 | A1 | 3/2003 |
| WO | 03/104671 | A1 | 12/2003 |

* cited by examiner

US 8,007,027 B2

DOOR OPERATING APPARATUS, ELECTROMAGNETIC CLUTCH, AND COUPLING MECHANISM

CROSS-REFERENCE TO RELATED APPLICATIONS

This is a Continuation of application Ser. No. 11/782,904 filed Jul. 25, 2007, which is a Divisional of application Ser. No. 11/119,855 filed May 3, 2005. The entire disclosure of the prior applications are considered part of the disclosure of the accompanying Continuation Application and are hereby incorporated by reference in their entirety.

BACKGROUND OF THE INVENTION

1) Field of the Invention

The present invention relates to a door operating apparatus that opens and closes a door of a vehicle, and more particularly to a door operating apparatus including a detector that detects a rotation by a driving source. The present invention further relates to an electromagnetic clutch that controls a transmission of a driving power, and a coupling mechanism for coupling a movable portion.

2) Description of the Related Art

A door operating apparatus that opens and closes a door of a vehicle generally include a clutch unit that is constituted in an output shaft between a driving motor and a door operating mechanism, in which a door is moved for opening or closing by applying a driving force to the door operating mechanism when the driving motor is driven during ON state of the clutch unit, while the door is manually moved for operating when the clutch unit is turned OFF. The clutch unit is of an electromagnetic type constituted to be turned ON when current is supplied to a coil which is an electromagnetic coil body serving as a clutch driving section, and is constituted to mutually join an armature linked to a driving shaft of the driving motor and a rotor linked to the door operating mechanism by an electromagnetic attracting force to transmit a driving force of the driving motor to the door operating mechanism (see, for example, Japanese Patent Application Laid-Open No. 2003-74255).

There is an operating apparatus that opens and closes a slide door provided on a side of a vehicle main body. The operating apparatus is linked to a driving section, where a driving force of a motor is transmitted to a rotational shaft via a clutch mechanism. The slide door is moved in a sliding manner according to rotation of the rotational shaft. The operating apparatus rotatably supports the rotational shaft to a case. An output gear and a rotor rotated integrally are supported to the rotational shaft in the case. A movable plate that is rotatable relative to the rotational shaft and is engageable with and disengageable from the rotor is supported in the case. An armature is fixed to the movable plate. In the case, an electromagnetic coil body is arranged to face the armature via the rotor to form a magnetic closed loop in cooperation with the armature and the rotor and attract the armature toward the rotor, thereby causing the movable plate to be engaged with the rotor. In the case, a driving device has a rotary sensor that detects rotation of the rotor provided with an annular magnetic member fixedly arranged on an outer peripheral edge of the rotor outside the closed loop and Hall elements facing an outer peripheral face of the magnetic body (see, for example, Japanese Patent Application Laid-Open No. 2000-179233).

As a driving mechanism that opens and closes a slide door provided on a side of a vehicle main body, there is one provided with a reduction gear structure. The reduction gear structure has a worm gear and a worm wheel gear meshing with the worm gear. The worm gear is fixed to an output shaft of a motor. The worm wheel gear is rotatably supported relative to a rotational shaft via a spacer. A disc-like armature made of a magnetic material together with the worm wheel gear is rotatably supported relative to the rotational shaft via the spacer. The armature is supported so as to be movable in an axial direction of the rotational shaft. A disc-like rotor made of a magnetic material is fixed to the rotational shaft. An annular electromagnetic coil member is arranged about the rotational shaft. When current is supplied to the electromagnetic coil member, electromagnetic force attracting the armature toward the rotor is generated. Thus, the armature and the rotor are frictionally engaged with each other. As a result, rotation of the worm gear driven by the motor is transmitted to the rotational shaft via the armature and the rotor rotated together with the worm wheel gear. Thus, the reduction gear structure constitutes the so-called electromagnetic clutch (see, for example, Japanese Patent Application Laid-Open No. 2003-74255).

In the conventional electromagnetic clutch, assuming that an axial direction of the rotational shaft is vertical, the electromagnetic coil member is disposed in a lower region of the rotor, the armature is disposed on an upper face of the rotor, and the worm wheel gear is disposed above the armature. The rotor and the armature have substantially the same outer diameter. The worm wheel gear has an outer diameter smaller than that of the armature. A grease is filled in a space where the worm wheel gear and the worm gear mesh with each other. As described above, in the conventional electromagnetic clutch, however, since the worm wheel gear has an outer diameter smaller than that of the armature, the grease enters between the armature and the rotor via the armature. Thus, sliding occurs in frictional engagement between the armature and the rotor, which hinders transmission of rotation of the worm gear driven by the motor to the rotational shaft. In the conventional electromagnetic clutch, therefore, a disc-like sealing member with a diameter larger than an outer diameter of the armature is interposed between the worm wheel gear and the armature so as to prevent grease from entering in between the armature and the rotor.

There are operating apparatuses that automatically open and close an operating member provided on a rear part of a vehicle. The operating member is a back door of a so-called flip-up type hinge-coupled at an upper and rear portion of the vehicle main body. The operating apparatus constitutes an actuator that opens and closes the back door. The actuator includes a driving unit fixedly provided at a rear pillar of the vehicle main body, an arm rotated integrally with an output shaft of the driving unit, and an elongated rod coupling a distal end of the arm and the back door. A ball joint is employed at a portion connecting the arm and the rod as a coupling mechanism. The ball joint has a ball fixed to the arm and a receiving portion provided on the rod. A clearance between the ball and the receiving portion fitted to each other is filled with highly-viscous grease. The highly-viscous grease prevents swinging of the back door when the back door suddenly moves due to displacement of load acting at a time of opening or closing the back door. A buffer member is interposed so as not to generate noise due to interference of the arm and the rod when the rod is rotated about an axial line extending in a longitudinal direction thereof. The buffer member is provided so as to cover a washer provided on the side of the ball for fixing the ball to the arm (see, for example, Japanese Patent Application Laid-Open No. 2004-44368).

In the operating apparatus provided with the clutch unit in the above manner (see, for example, Japanese Patent Application Laid-Open No. 2003-74255), a stable operation in the door operating mechanism depends on whether a clutch driving section that supports rotation of the output shaft can be firmly held. That is, in order to securely join the armature and the rotor to transmit a rotational force between the both and actuate the operating mechanism, it is necessary to hold the output shaft serving as the rotational shaft for the armature and the rotor along a predetermined axial center securely and it is necessary to firmly hold the clutch driving section serving as a bearing member for the output shaft to the utmost extent. In the conventional technique, therefore, a clutch housing covering one end face and an outer peripheral face of the clutch driving section is provided to a motor bracket covering the output shaft of the driving motor, and the clutch driving section is fixed to one end face of the clutch housing. According to the door operating apparatus thus constituted, since a structure with high strength can be constituted of the motor bracket and the clutch housing, the clutch driving section can be held firmly, and the door operating mechanism can be actuated stably. However, the door operating apparatus provided with the clutch housing together with the motor bracket is considerably disadvantageous regarding its weight, thereby limiting a mounting position therefor.

In the conventional door operating apparatus (see, for example, Japanese Patent Application Laid-Open No. 2000-179233), since a magnetic member is fixedly arranged on an outer peripheral edge of the rotor, the magnetic member is disposed at the outermost peripheral position of the driving section so as to form a large annular shape. The rotary sensor detects rotation of the rotor by the Hall elements facing an outer peripheral face of the magnetic member. In the conventional door operating apparatus, therefore, a distance between the magnetic member and the Hall elements easily fluctuates in the axial direction or a diametrically longitudinal direction of the rotational shaft during rotation of the rotor, which decreases accuracy for detecting rotation of the rotor. In the conventional door operating apparatus, the magnetic member is fixedly arranged on the outer peripheral edge of the rotor outside the closed loop, but the closed loop is formed of the armature and the rotor by the electromagnetic coil member. That is, as long as the magnetic member is provided on the rotor, the magnetic member is positioned so as to be substantially influenced by the closed loop. Accordingly, in the conventional door operating apparatus, magnetic flux from the magnetic member is changed by magnetic closed loop, which deceases accuracy for detecting rotation of the rotor. Furthermore, in the conventional door operating apparatus, a main constitution for the driving section is provided in the case to form a driving unit integrated with the motor and the case is fixed to the body of the vehicle via a bracket. That is, the case is constituted as a metal member having rigidity necessarily. In the conventional driving device, the magnetic member is fixedly disposed on the outer peripheral edge of the rotor and the Hall elements opposed to the outer peripheral face of the magnetic member are provided inside the case, as described above. In the conventional door operating apparatus, therefore, the metal case is made large in a diametrically outward direction of the rotational shaft, which increases the weight of the entire apparatus.

In the conventional electromagnetic clutch (see, for example, Japanese Patent Application Laid-Open No. 2003-74255), since the sealing member only covers an upper face of the armature, when grease reaches below the sealing member, grease cannot be sufficiently prevented from entering in between the armature and the rotor. Since the sealing member is provided as a separate member from the worm wheel gear or the armature, it is difficult to assemble the electromagnetic clutch. In the conventional electromagnetic clutch, since a constitution for preventing grease from entering in between the worm wheel gear and the rotational shaft is not provided, grease enters between the armature and the rotor from a clearance between the worm wheel gear and the rotational shaft via the rotational shaft.

In the conventional coupling mechanism (see, for example, Japanese Patent Application Laid-Open No. 2004-44368), the buffer member interposed between the arm and the rod serves only when the rod is rotated about the axial line and the edge of the receiving portion is forced to come in contact with the washer for the ball. That is, the buffer member does not always serve in a direction in which the arm and the rod are prevented from contacting with each other. Accordingly, since a play in fitting between the ball and the receiving portion is received by only highly-viscous grease, the play in fitting is substantially present. That is, the sudden movement of the back door to swing due to displacement of load acting at a time of opening or closing the back door can be reduced owing to highly-viscous grease, but it is not yet solved.

SUMMARY OF THE INVENTION

It is an object of the present invention to solve at least the above problems in the conventional technology.

A door operating apparatus according to one aspect of the present invention, which opens and closes a door of a vehicle by transmitting a driving force of a driving motor to a door operating mechanism, includes a motor bracket that covers a driving shaft of the driving motor, and holds the driving motor to a supporting bracket; an output shaft that is disposed from the motor bracket toward the supporting bracket so as to be orthogonal to an extending direction of the driving shaft; a first rotational element that is linked with the driving shaft of the driving motor, and disposed on the output shaft; a second rotational element that is linked with the door operating mechanism, and disposed between the first rotational element and the supporting bracket on the output shaft; and a clutch unit including a clutch driving section that supports a rotation of the output shaft held by the supporting bracket. When the first rotational element and the second rotational element are engaged by driving of the clutch driving section, the door operating mechanism is actuated by the driving force of the driving motor.

A door operating apparatus according to another aspect of the present invention includes an electromagnetic clutch that is disposed around a rotational shaft, and transmits a driving force of a driving motor to the rotational shaft; a magnetic member in a disk shape the is disposed on an end portion of the rotational shaft, and rotated with a rotation of the rotational shaft; and a Hall element that is disposed in opposite to a disc surface of the magnetic member in a predetermined distance.

An electromagnetic clutch according to still another aspect of the present invention includes a transmission gear that is provided rotatably relative to a clutch shaft; a magnetic member that is rotatable relative to the clutch shaft, and engaged with the transmission gear; a rotational portion that is fixed to the clutch shaft; a coil unit that is disposed around the clutch shaft, and when the coil unit is excited, attracts the magnetic member to frictionally engage the magnetic member with the rotational portion; and a cover member that is formed integrally with the transmission gear, includes the magnetic member, and covers an outside portion of the rotational portion.

A coupling mechanism according to still another aspect of the present invention includes a first member including a head portion in a spherical shape; a second member including a recessed portion that fits with the head portion; and a spacer that is provided between the first member and the second member, and generates an elastic force such that the first member and the second member are separated from each other.

The other objects, features, and advantages of the present invention are specifically set forth in or will become apparent from the following detailed description of the invention when read in conjunction with the accompanying drawings.

DETAILED DESCRIPTION

Exemplary embodiments of a door operating apparatus, an electromagnetic clutch, and a coupling mechanism according to the present invention are explained in detail below with reference to the accompanying drawings.

Figure 1:
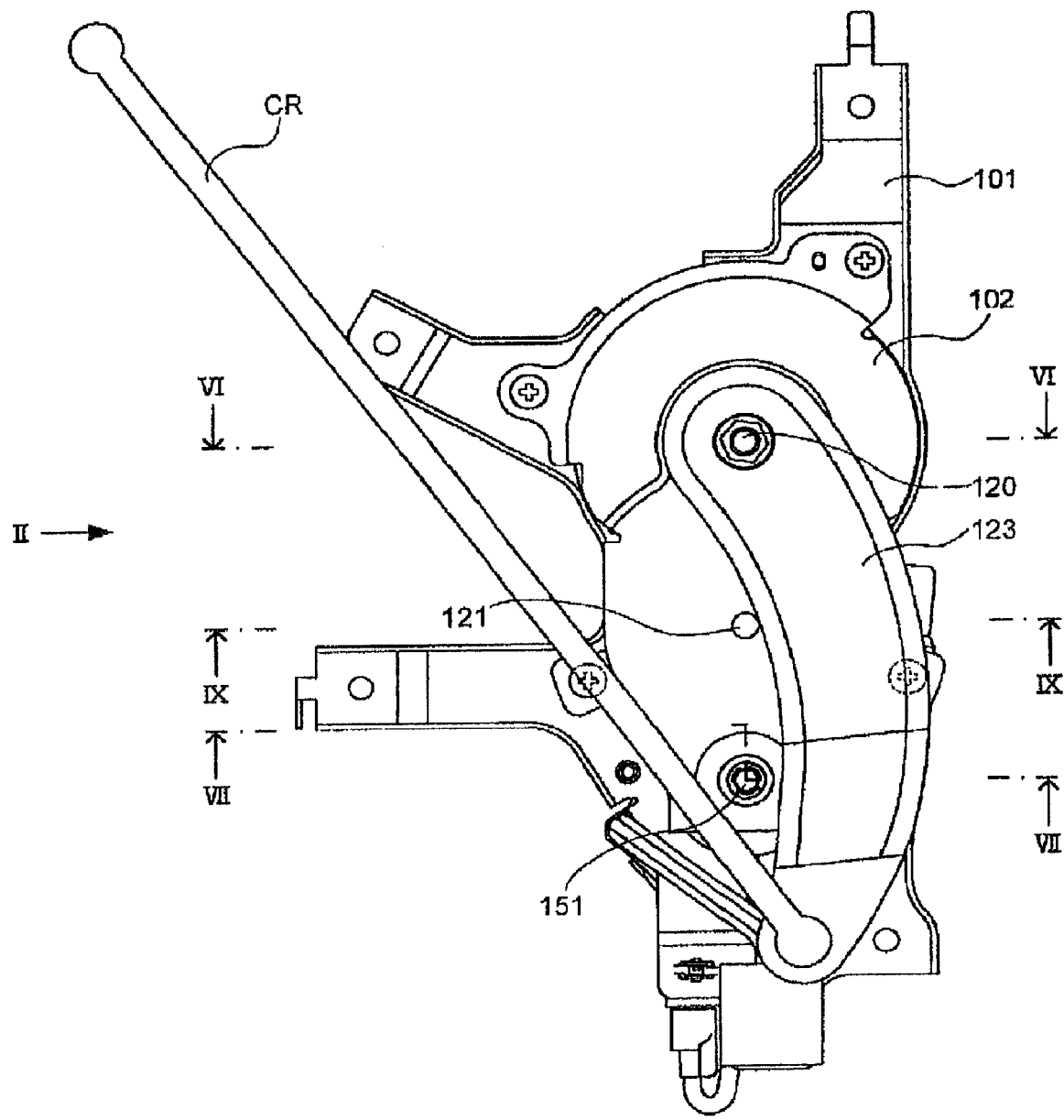
FIG. 1 depicts a door operating apparatus according to a first embodiment of the present invention, viewed from an interior side of a vehicle.
Figure 2:
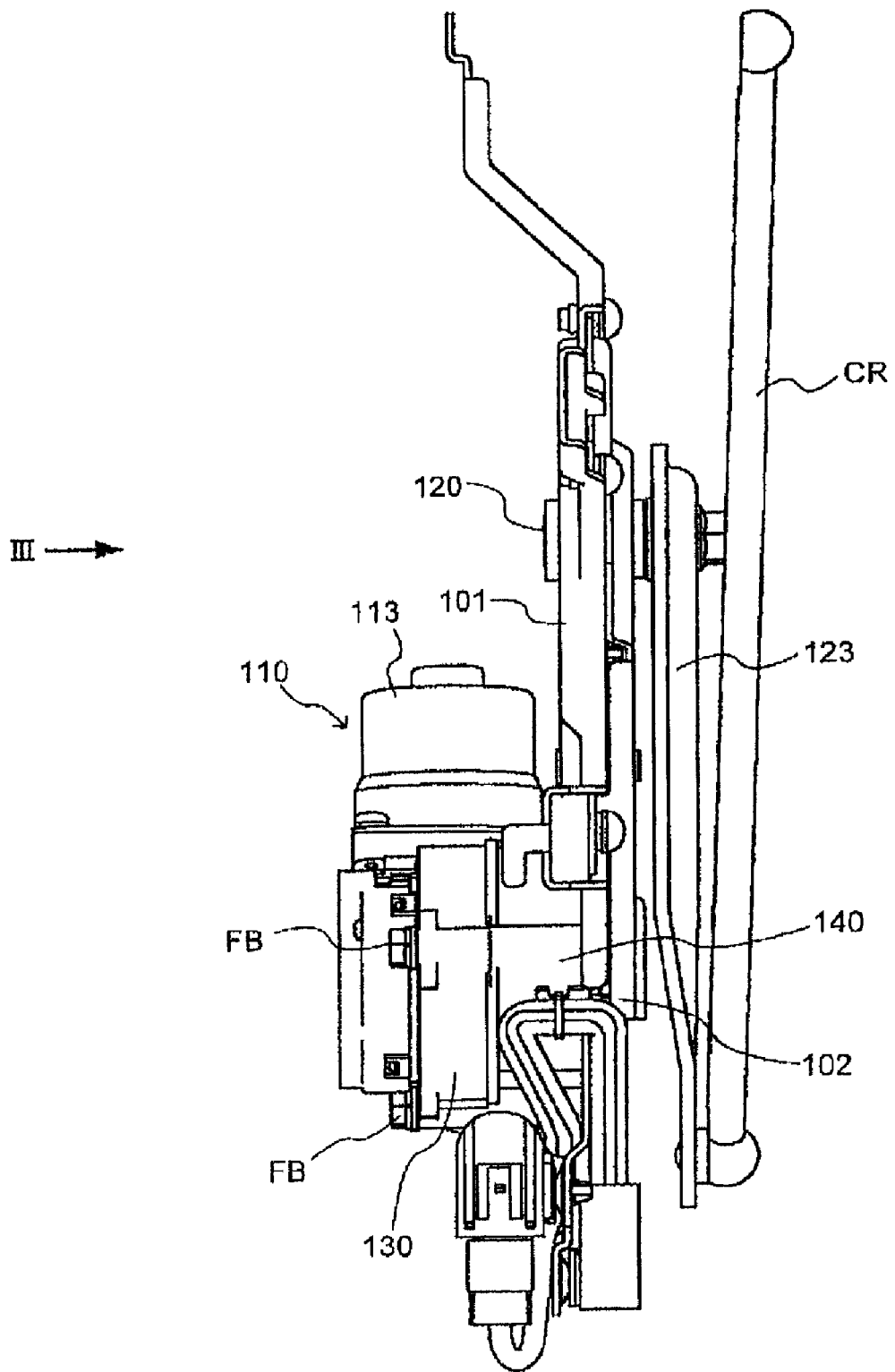
FIG. 2 depicts the door operating apparatus, seen in a direction of arrow II shown in FIG. 1.
Figure 3:
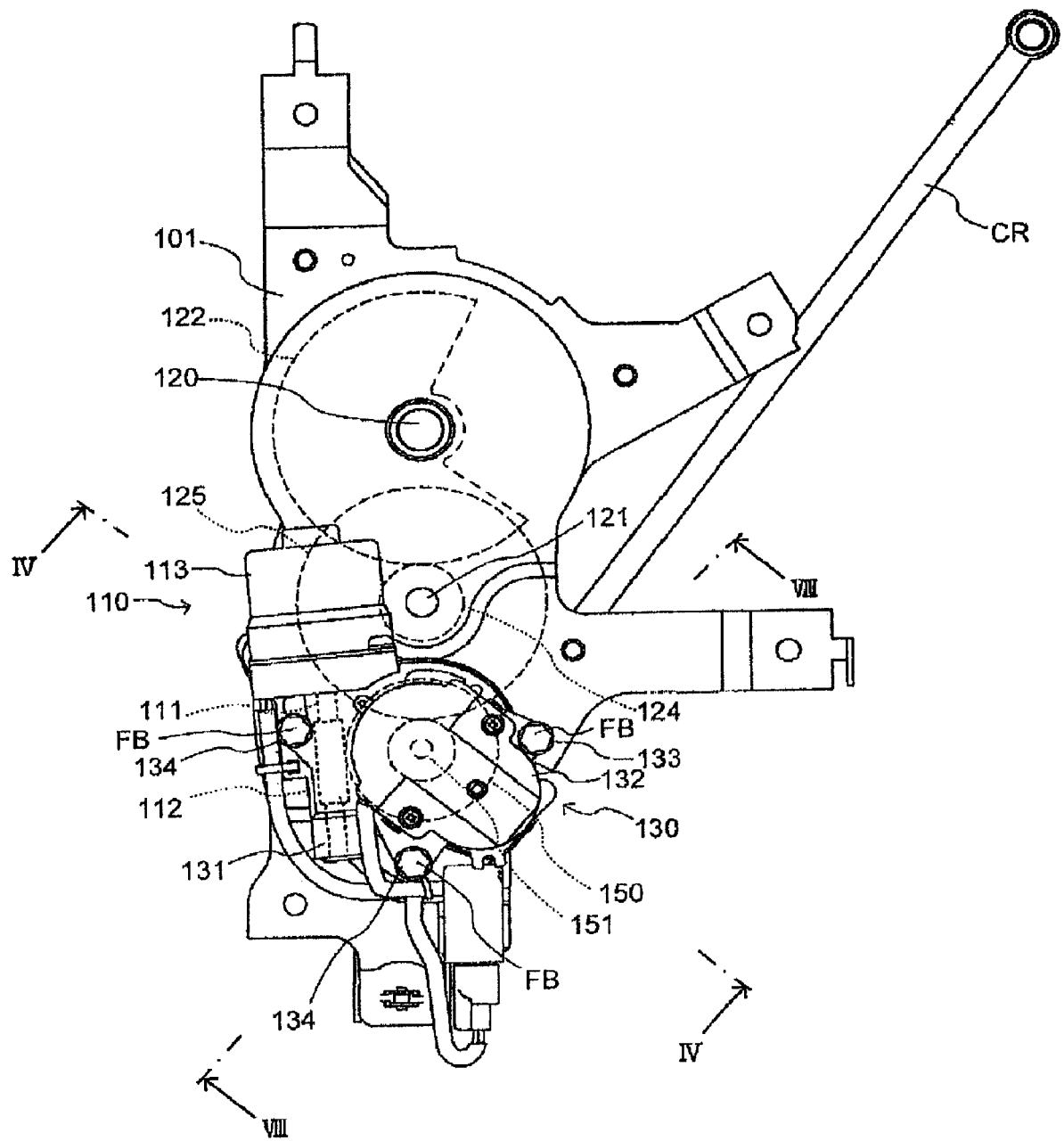
FIG. 3 depicts the door operating apparatus, seen in a direction of arrow III shown in FIG. 2.
Figure 4:
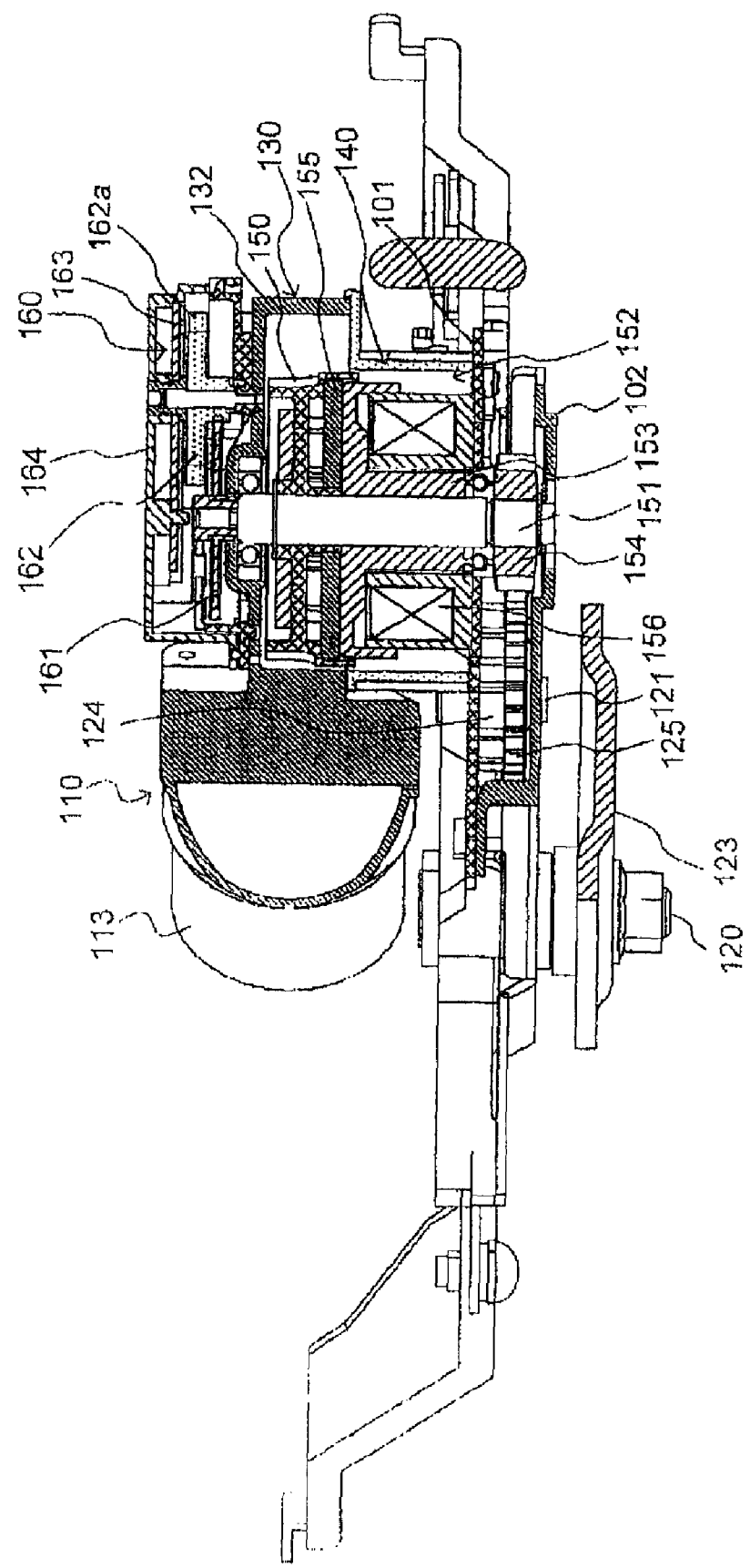
FIG. 4 is a cross-section of the door operating apparatus, taken along line IV-IV in FIG. 3.
Figure 5:
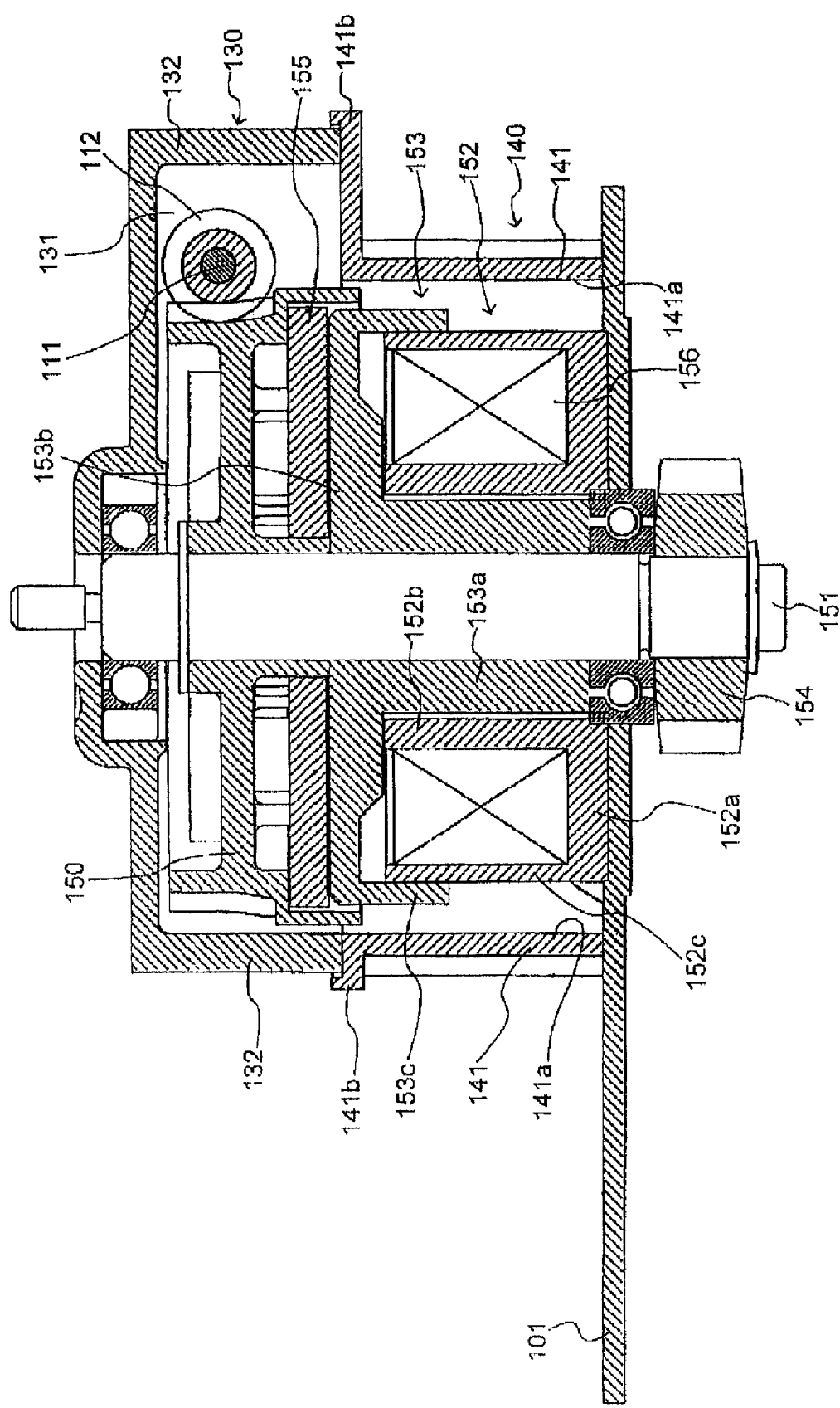
FIG. 5 is an enlarged cross-section of relevant parts of the door operating apparatus shown in FIG. 4.
Figure 6:
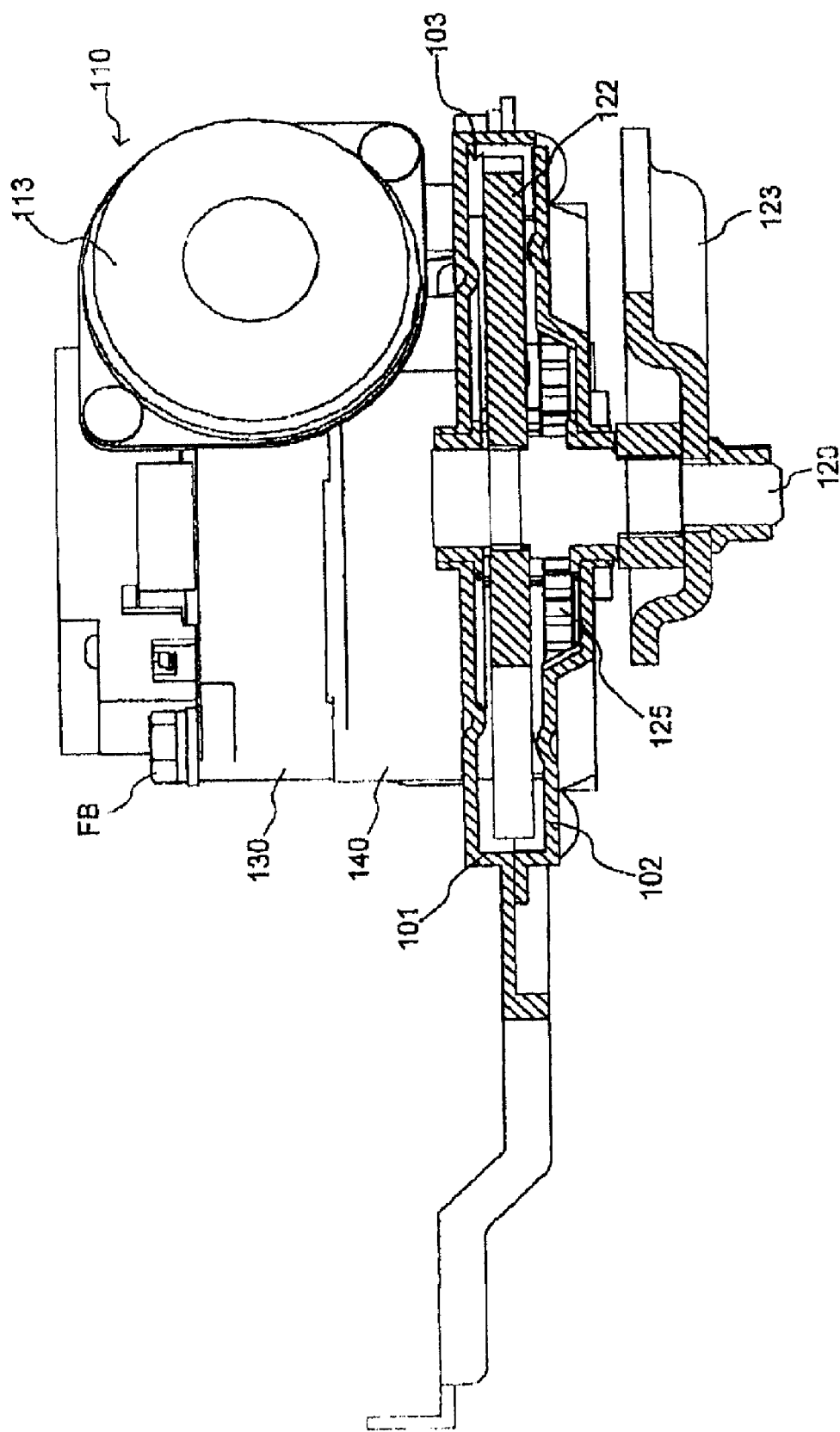
FIG. 6 is a cross-section of the door operating apparatus, taken along line VI-VI in FIG. 1.
Figure 7:
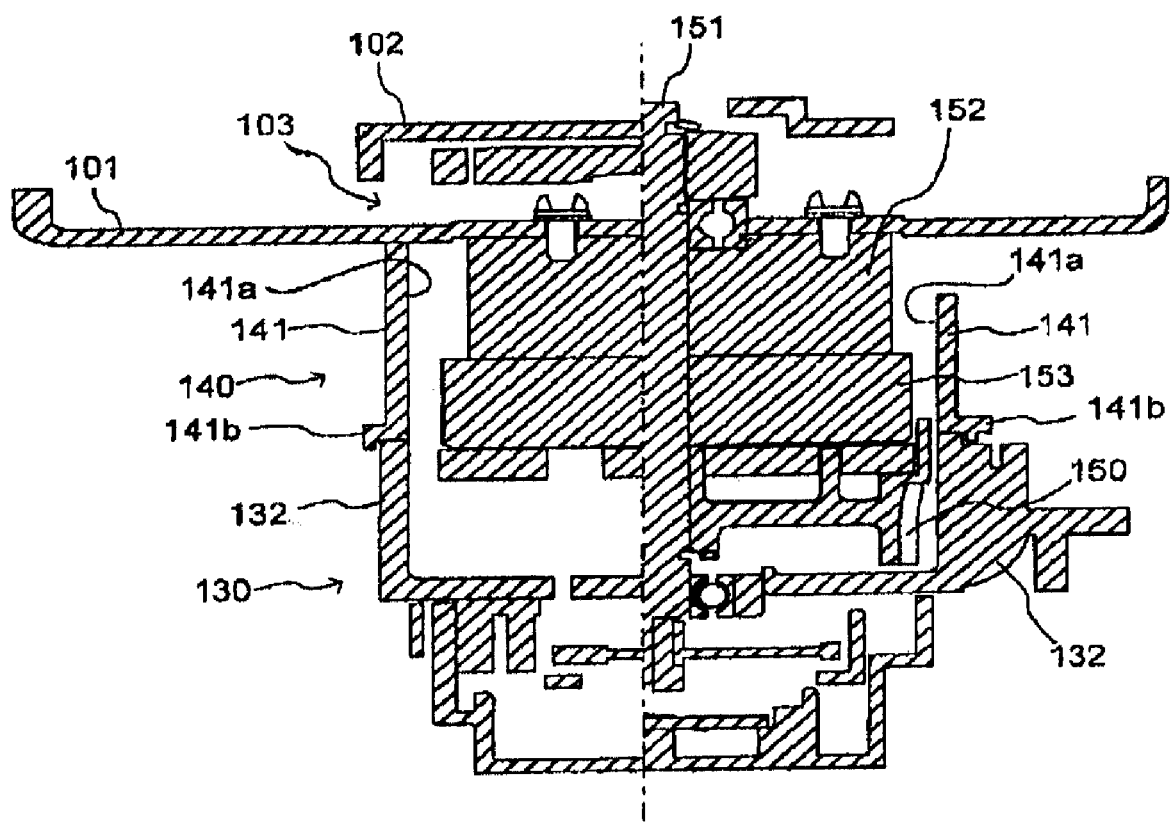
FIG. 7 is a cross-section of the door operating apparatus, taken along line VII-VII in FIG. 1.
Figure 8:
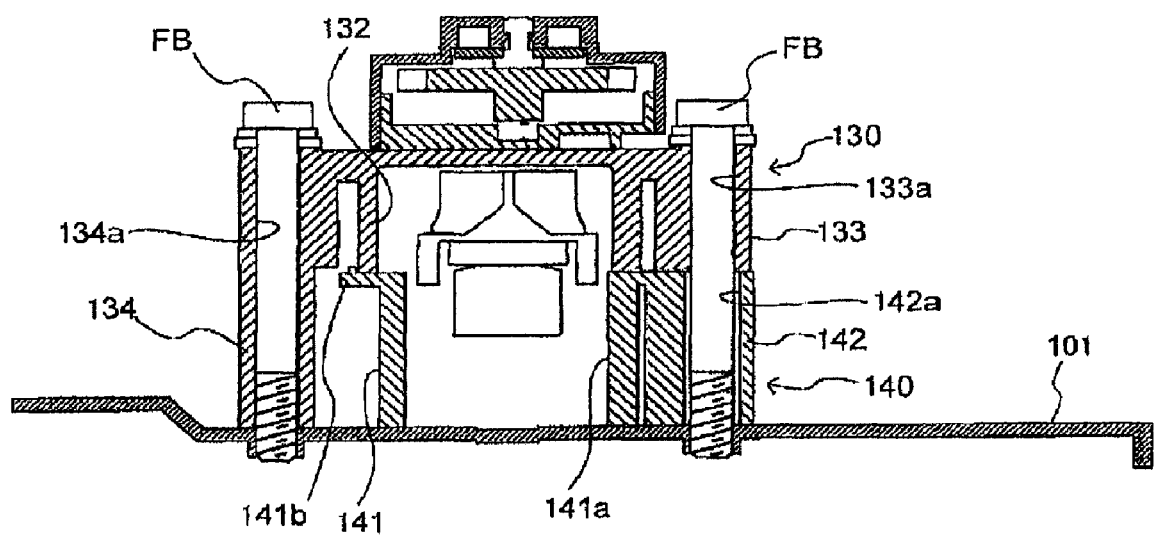
FIG. 8 is a cross-section of the door operating apparatus, taken along line VIII-VIII in FIG. 3.
Figure 9:
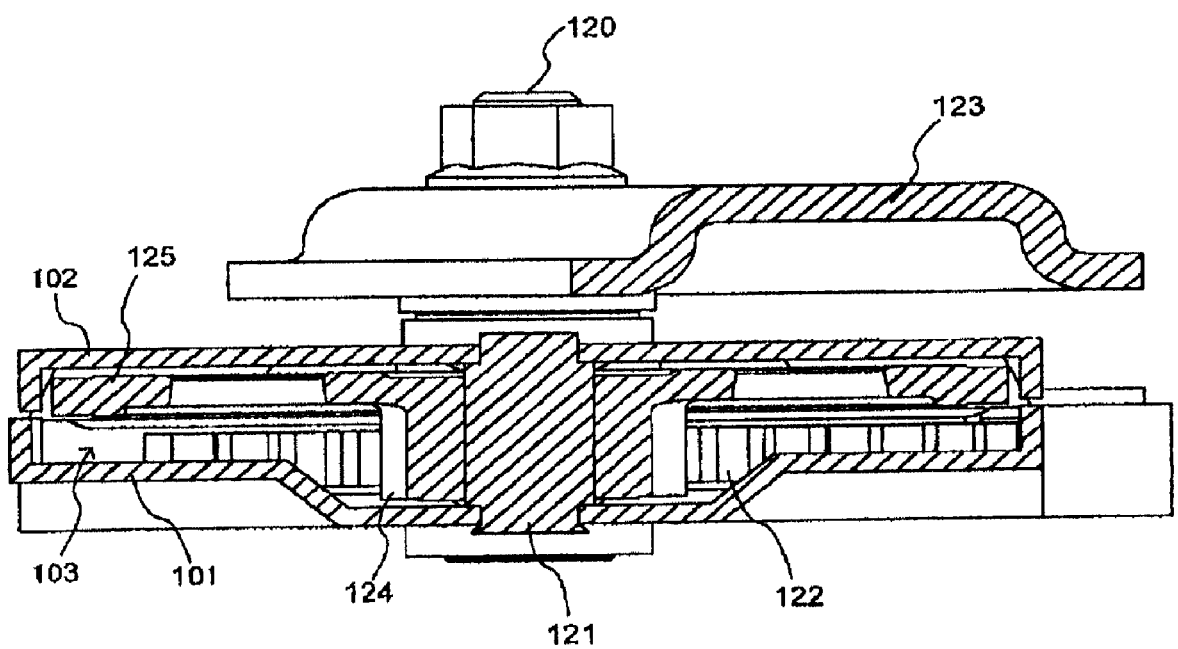
FIG. 9 is a cross-section of the door operating apparatus, taken along line IX-IX in FIG. 1.
Figure 10:
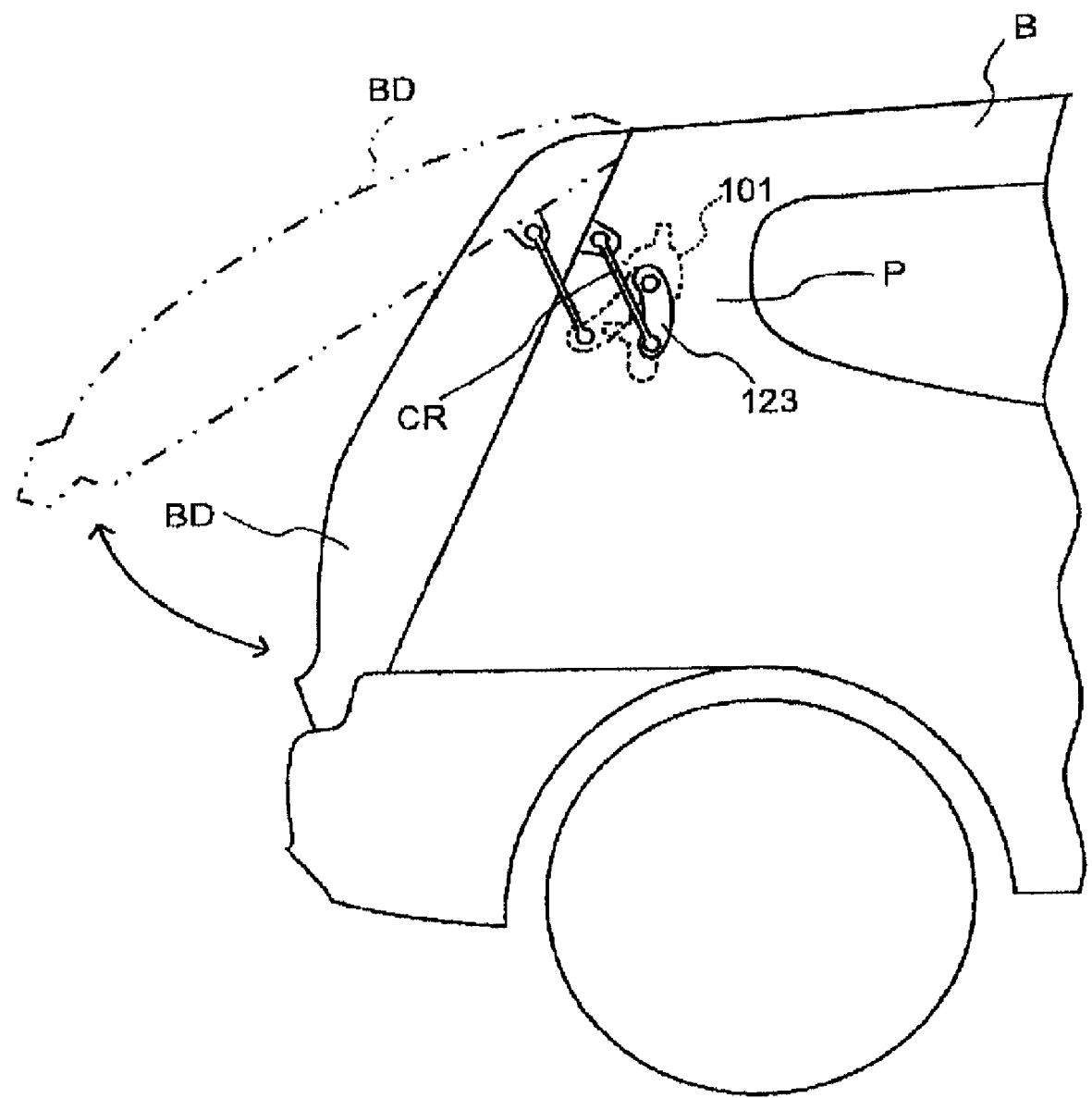
FIG. 10 is a conceptual view of a vehicle applied with the door operating apparatus shown in FIG. 1.

FIGS. 1 to 9 depict a door operating apparatus according to an embodiment of the present invention. The door operating apparatus explained in the present embodiments moves a back door BD in an operating manner via an upper hinge provided on a rear end opening portion of a vehicle main body B for a vehicle such as a four-wheeled automobile, as shown in FIG. 10, and is provided with a supporting bracket 101 and a driving motor 110.

As shown in FIGS. 1 to 9, the supporting bracket 101 is a plate-like member constituting a base for the door operating apparatus, and is made from a member with sufficient rigidity such as a steel plate. The supporting bracket 101 is provided with an arm shaft 120 and an idle shaft 121 such that both the shafts are parallel to each other in an accommodating space 103 defined between the supporting bracket 101 and a cover plate 102.

The arm shaft 120 is disposed at one end portion of the supporting bracket 101 so as to be rotatable to the supporting bracket 101 and the cover plate 102, and is provided with a sector gear 122 and an arm member 123. The sector gear 122 is formed in a fan shape to have teeth on its arc face, and is mounted in the accommodating space 103 so as to be rotated integrally with the arm shaft 120. The arm member 123 is mounted on an end portion of the arm shaft 120 projecting from the cover plate 102, and is swung about the arm shaft 120 when the arm shaft 120 is rotated. A connection rod CR linked with the back door BD is swingably supported to a distal end portion of the arm member 123.

The idle shaft 121 is mounted on an intermediate portion of the supporting bracket 101, and is provided with a first idle gear 124 and a second idle gear 125. The first idle gear 124 is a spur gear with a relatively small diameter, and meshes with the sector gear 122. The second idle gear 125 is a spur gear with a diameter larger than that of the first idle gear 124, and is formed integrally with the first idle gear 124 such that center axes of the second idle gear 125 and the first idle gear 124 are coincident with each other. The first idle gear 124 and the second idle gear 125 are disposed to be rotatable to the idle shaft 121.

The driving motor 110 is an electric motor whose driving shaft 111 is provided with a worm gear 112, and is mounted on the other end portion of the supporting bracket 101 via a motor bracket 130 and a cover member 140.

The motor bracket 130 has a shaft accommodating portion 131, a gear accommodating portion 132, a bolt insertion portion 133, and column-shaped members 134, and is formed integrally by die-cast forming using metal with relatively high rigidity, such as aluminum. The shaft accommodating portion 131 covers the driving shaft 111 of the driving motor 110 projecting from the motor housing 113 and the worm gear 112, and is attached to the motor housing 113 for the driving motor 110. The gear accommodating portion 132 accommodates a worm wheel 150, described later, and is formed in a cylindrical shape with a bottom on a side of the shaft accommodating portion 131. The bolt insertion portion 133 is a cylindrical portion provided on an outer peripheral portion of the gear accommodating portion 132, and is formed to have the same height as that of the gear accommodating portion 132. The bolt insertion portion 133 is formed at its central portion with a bolt insertion hole 133a. The column-shaped members 134 are provided to extend from a portion defining an outer peripheral region of the gear accommodating portion 132 in a direction orthogonal to the driving shaft 111 of the driving motor 110, and their distal end faces project from an end face of the gear accommodating portion 132 by the same height. Each of the column-shaped members 134 is formed at an axial center portion thereof with a bolt mounting hole 134a.

The cover member 140 has a cylindrical portion 141 and a bolt through portion 142, and is integrally formed of hard synthetic resin, such as PBT resin (polybutylene terephthalate). The cylindrical portion 141 has a central hole 141a corresponding to an inner space of the gear accommodating portion 132 of the motor bracket 130 and has a flange 141b at one end thereof facing outward with respect to the outer peripheral portion. The bolt through portion 142 has a cylindrical shape provided on an outer peripheral portion of the cylindrical portion 141, and is provided at a portion corresponding to the bolt insertion portion 133 of the motor bracket 130. The bolt through portion 142 is provided at a central portion thereof with a bolt through portion 142a.

The driving motor 110 is mounted on the supporting bracket 101 such that the axial center of the driving shaft 111 is positioned along an extending direction of the supporting bracket 101 and the motor housing 113 is disposed within a projection area of an outer surface of the supporting bracket 101 by inserting fastening bolts FB from the bolt insertion holes 133a formed in the bolt insertion portions 133 of the motor bracket 130 to the bolt through-holes 142a formed in the bolt through portions 142 of the cover member 140 in such a state that the cover member 140 is interposed between the motor bracket 130 and the supporting bracket 101, further by inserting the fastening bolts FB into the bolt mounting holes 134a formed in the column-shaped member 134 of the motor bracket 130, and by fastening the fastening bolts FB.

On the other hand, in the door operating apparatus, an output shaft 151 is provided at a portion covered with the gear accommodating portion 132 of the motor bracket 130 and the cylindrical portion 141 of the cover member 140, while a stator 152 is provided at a portion surrounding the output shaft 151 on the outer surface of the supporting bracket 101.

The output shaft 151 is disposed from the motor bracket 130 toward the supporting bracket 101 so as to be orthogonal to an extending direction of the driving shaft 111 and be parallel with the arm shaft 120 and the idle shaft 121, and one end portion thereof is rotatably supported to a bottom wall of the gear accommodating portion 132 of the motor bracket 130, while the other end thereof is rotatably supported to the supporting bracket 101.

The output shaft 151 is provided with a worm wheel 150, a rotor 153, and a drive pinion 154. The worm wheel 150 is rotatably fitted on the output shaft 151 and meshes with the worm gear 112 provided on the driving shaft 111 of the driving motor 110 in the gear accommodating portion 132 of the motor bracket 130. The worm wheel 150 is provided with an armature 155 at an end face thereof facing the supporting bracket 101. The armature 155 is a disc-shaped member made of a magnetic material. The armature 155 is rotatably fitted on the output shaft 151, while it meshes with a projection protruded from the worm gear 112 to be rotatable with respect to the output shaft 151 together with the worm gear 112. The rotor 153 has a cylindrical shaft portion 153a provided at one end outer periphery thereof with a flange-like disc portion 153b, and is integrally made of magnetic material. The disc portion 153b of the rotor 153 has a disc shape having an outer diameter approximately equal to that of the armature 155, and the rotor 153 is fixed to an intermediate portion of the output shaft 151 via a central hole of the shaft portion 153a in a state that the disc portion 153b approaches to the armature 155. A cylindrical overlapping portion 153c is provided on an outer peripheral edge portion of the disc portion 153b along an extending direction of the shaft portion 153a in a projecting manner. The drive pinion 154 is fixed to a portion of the output shaft 151 projecting from the supporting bracket 101, and meshes with the second idle gear 125 in the accommodating space 103.

One end portion of the output shaft 151 is provided with a rotary sensor 160. The rotary sensor 160 includes a sensor gear 161, a magnet disc plate 162, and Hall elements 163, and is covered with a resin sensor case 164 mounted on the motor bracket 130. The sensor gear 161 is made of synthetic resin and is provided at an end portion of the output shaft 151 such that axial centers of the former and the latter coincide with each other. The magnet disc plate 162 is rotationally driven according to rotation of the sensor gear 161, and is provided at an outer peripheral edge portion of one end portion thereof with a magnetic strip 162a. The magnetic strip 162a is an annular permanent magnet where N and S poles are alternatively and sequentially arranged along a circumferential direction. The Hall elements 163 are arranged at a portion facing the magnetic strip 162a of the magnet disc plate 162, and are used for detecting such a rotating state as a rotational direction or the number of rotations of the output shaft 151 via the magnet disc plate 162 based on change of magnetic pole.

The stator 152 has an inner cylindrical portion 152b on an inner peripheral portion of a bottom plate 152a formed in an annular shape and an outer cylindrical portion 152c on an outer peripheral portion of the bottom plate 152a, and accommodates an electromagnetic coil 156 between the inner cylindrical portion 152b and the outer cylindrical portion 152c. The stator 152 is fixed to the supporting bracket 101 via the bottom plate 152a. The inner cylindrical portion 152b of the stator 152 has a length approximately equal to that of the shaft portion 153a of the rotor 153, and has an inner diameter that permits slidable fitting of the shaft portion 153a. The outer cylindrical portion 152c of the stator 152 is formed to have an outer diameter that permits slidable fitting to an inner wall face of the overlapping portion 153c provided on the rotor 153.

In the door operating apparatus thus constituted, the electromagnetic clutch unit includes the worm wheel 150 serving as a first rotational element, the rotor 153 serving as a second rotational element, and the stator 152 with the electromagnetic coil 156 serving as a clutch driving section. That is, the worm wheel 150 and the rotor 153 are rotatable relative to each other in an ordinary state, where power can not be transmitted between the both members. On the other hand, when current flows in the electromagnetic coil 156, the armature 155 is attracted to the stator 152 according to magnetic force, so that the armature 155 of the worm wheel 150 and the rotor 153 are put in a mutually joined state due to a frictional force occurring therebetween and power can be transmitted therebetween.

When the door operating apparatus described above is held in a retracted state shown in FIGS. 1 and 3, namely, when the arm member 123 is positioned in a projection area of the outer surface of the supporting bracket 101, and the arm member 123 is disposed on the vehicle interior side, as shown with a solid line in FIG. 10, while the supporting bracket 101 and the driving motor 110 are respectively accommodated inside a pillar P and the arm shaft 120 is positioned at an upper side, the door operating apparatus is fixedly provided to the pillar P via the supporting bracket 101. The arm member 123 disposed on the vehicle interior side is linked with the back door BD via the coupling rod CR.

When current is supplied to the electromagnetic coil 156 and the driving motor 110 is rotationally driven in one direction from the above state, rotation of the driving shaft 111 is transmitted to the worm wheel 150 via the worm gear 112, and rotation of the armature 155 rotated together with the worm wheel 150 is transmitted to the output shaft 151 via the rotor 153. Rotation of the output shaft 151 is transmitted to the door operating mechanism via the drive pinion 154, that is, the rotation is transmitted to the second idle gear 125, the first idle gear 124, the sector gear 122, and the arm shaft 120 sequentially, thereby swinging the arm member 123 fixed to the arm shaft 120 in a rearward direction of the vehicle, as shown with a double dotted chain line in FIG. 10. As a result, the back door BD with a released latch (not shown) is swung in the rearward direction of the vehicle via the coupling rod CR so that the rear end opening of the vehicle main body B is opened.

When current supplied to the electromagnetic coil 156 and the driving motor 110 is rotationally driven in the other direction from the above state, rotation of the driving shaft 111 is transmitted to the worm gear 112, the worm wheel 150, the armature 155, the rotor 153, the output shaft 151, the drive pinion 154, the second idle gear 125, the first idle gear 124, the sector gear 122, and the arm shaft 120 sequentially, thereby swinging the arm member 123 fixed to the arm shaft 120 in a forward direction of the vehicle, as shown with a solid line in FIG. 10. As a result, the back door BD is swung in the forward direction of the vehicle via the coupling rod CR, so that the rear end opening of the vehicle main body B is closed.

Meanwhile, the opened or closed state of the back door BD can be detected through the Hall elements 163 by rotation of the magnet disc plate 162 according to rotation of the output shaft 151, so that driving of the driving motor 110 is properly controlled based on the detection result.

When the back door BD is fully opened or shut, current supply to the electromagnetic coil 156 is stopped, and power transmission between the armature 155 and the rotor 153 is cut off. Therefore, swinging force transmitted to the arm member 123 via the coupling rod CR is not transmitted to the driving motor 110, so that the back door BD can be manually opened and closed with a relatively small operating force of a user.

According to the door operating apparatus constituted to make the supporting bracket 101 hold the stator 152 to support rotation of the output shaft 151 via the shaft portion 153a of the rotor 153 as described above, since the output shaft 151 is securely rotated about the axial center, when current is caused to flow in the electromagnetic coil 156, the armature 155 and the rotor 153 can be joined securely. As a result, the door operating mechanism can be activated stably, and the back door BD can be moved for opening or closing securely.

In this case, in the door operating apparatus, since the supporting bracket 101 serving as the base for the door operating mechanism is caused to hold the stator 152 without providing a constituent element for holding the stator 152 separately, weight does not increase significantly. In addition, since the outer peripheral portions of the stator 152 and the rotor 153 positioned between the motor bracket 130 and the supporting bracket 101 are covered with the cover member 140 made of a synthetic resin, and since increase of the diameters of the motor bracket 130 and the cover member 140 is prevented by constituting the rotary sensor 160 that detects rotating state of the output shaft 151 at the end portion of the output shaft 151 in the axial direction thereof, it is possible to reduce the weight of the door operating apparatus. Since the driving motor 110 is disposed to the supporting bracket 101 constituting the door operating mechanism within the outer face projection area thereof, the door operating apparatus is not increased in length along the supporting bracket 101. As a result, it is possible reduce the size and the weight of the door operating apparatus, and it is also possible to substantially reduce limitation applied when the door operating apparatus is mounted on the vehicle main body B.

According to the first embodiment, the door operating apparatus that moves the back door BD provided on the rear end opening of the vehicle main body B via the upper hinges for operating has been exemplified, but the present invention can be applied to a door opened and closed by another aspect.

Although the clearance to the supporting bracket 101 is secured by the column-shaped member 134 provided on the motor bracket 130, the column-shaped member 134 is not necessarily provided on the motor bracket 130. The column-shaped member 134 may be provided on the supporting bracket 101, or the column-shaped member 134 provided separately may be interposed between the motor bracket 130 and the supporting bracket 101.

Figure 11:
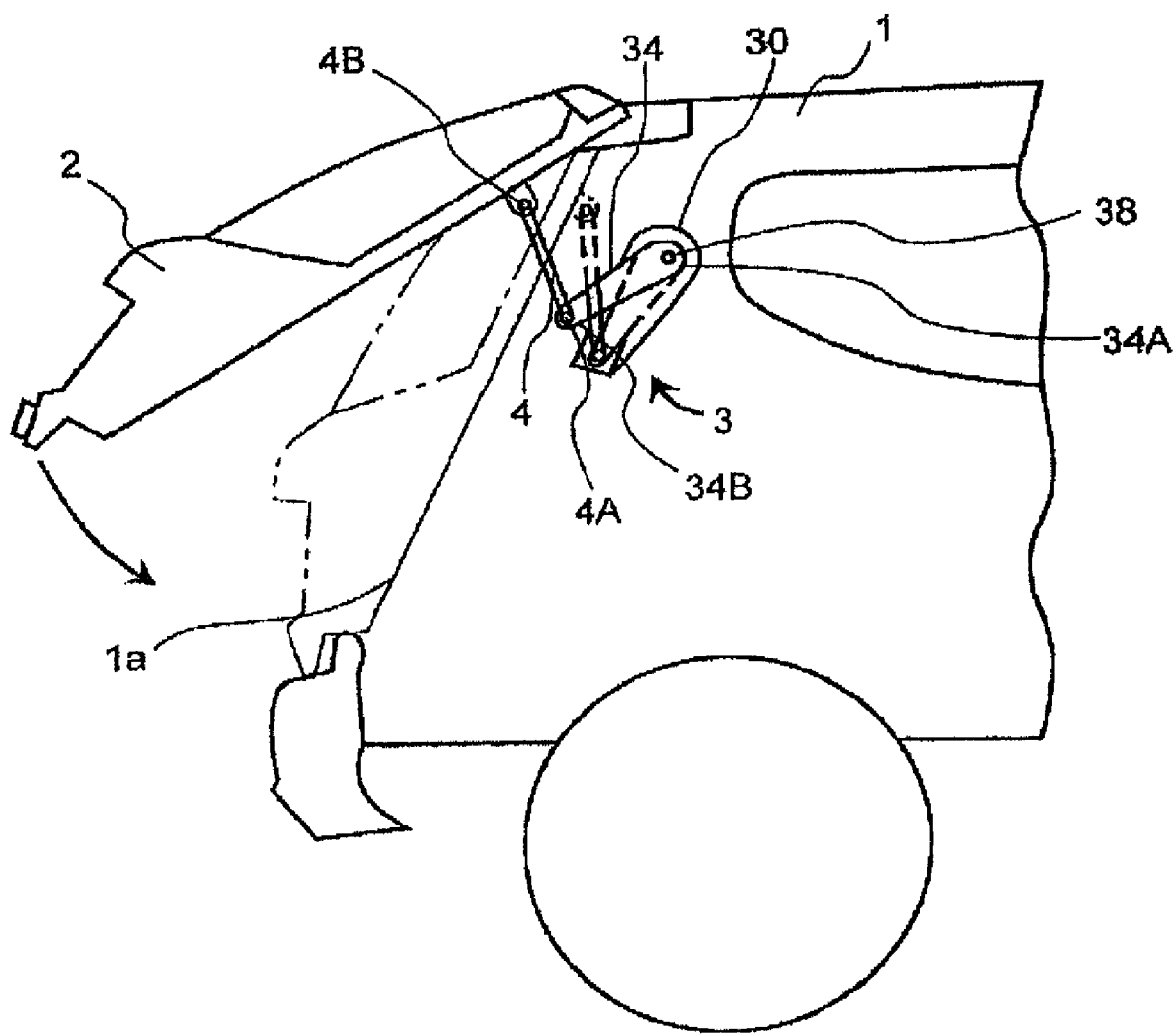
FIG. 11 is a conceptual view of a door operating apparatus according to a second embodiment of the present invention.
Figure 12:
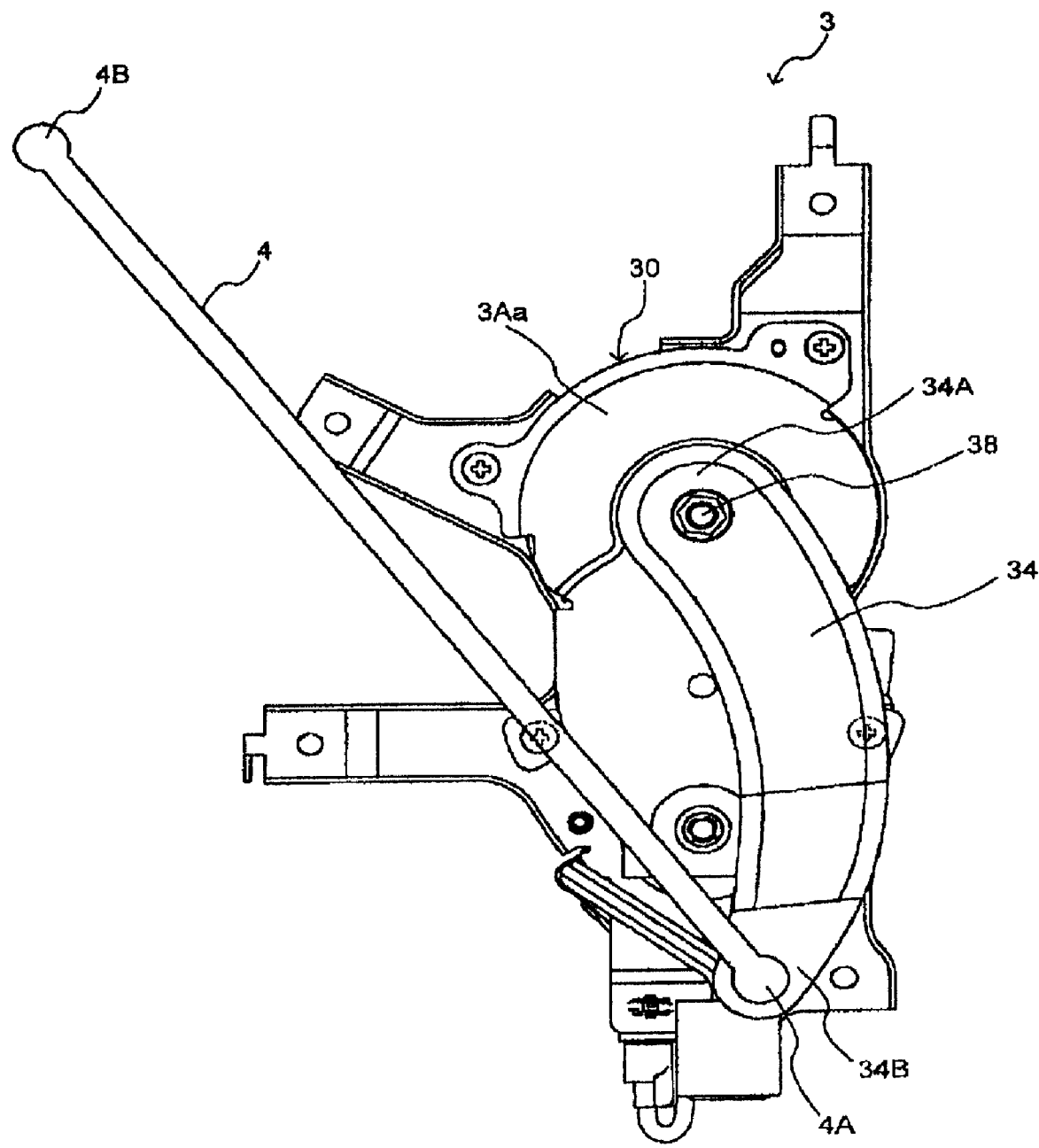
FIG. 12 is a front view of the door operating apparatus.
Figure 13:
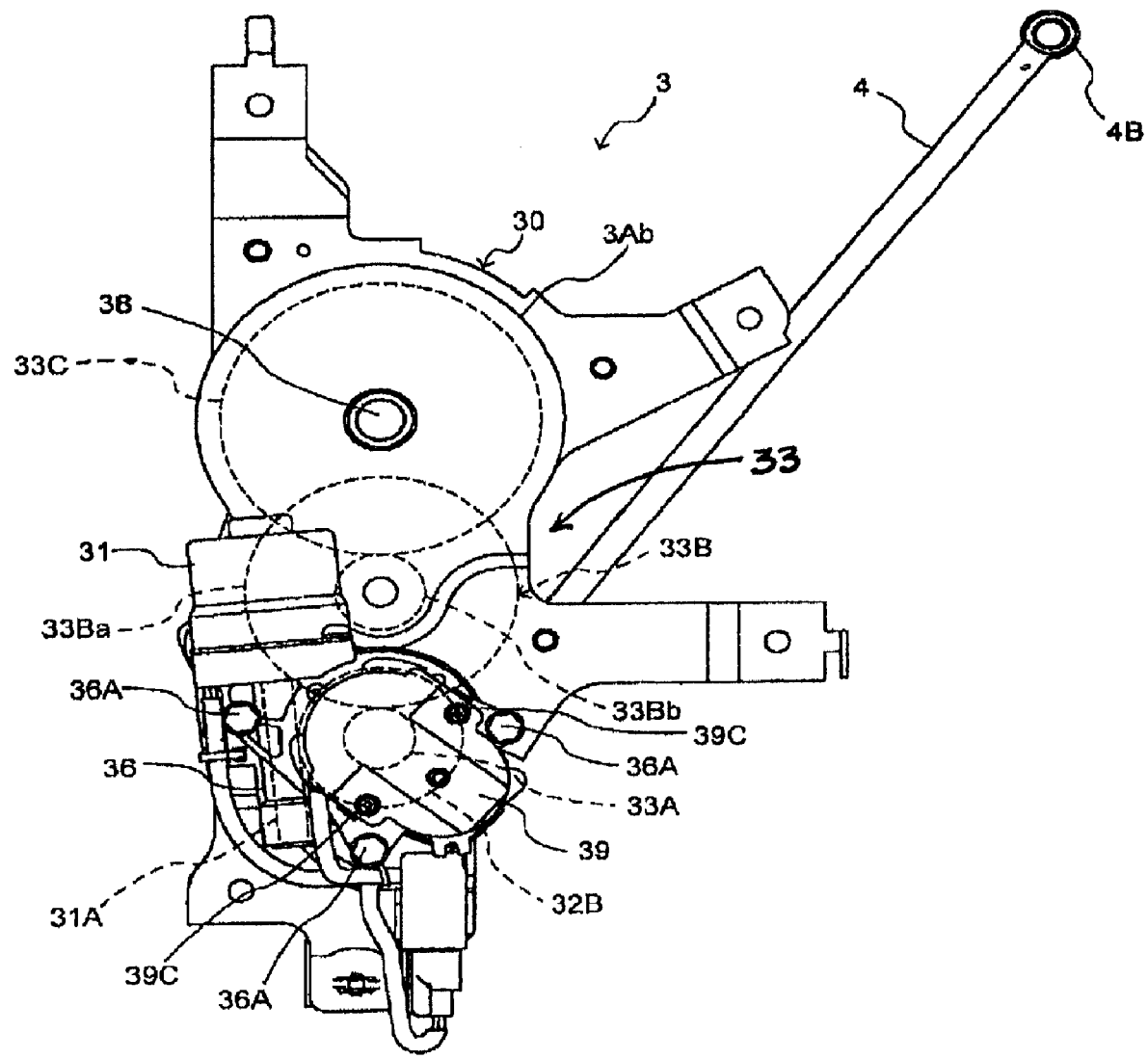
FIG. 13 is a rear view of the door operating apparatus.
Figure 14:
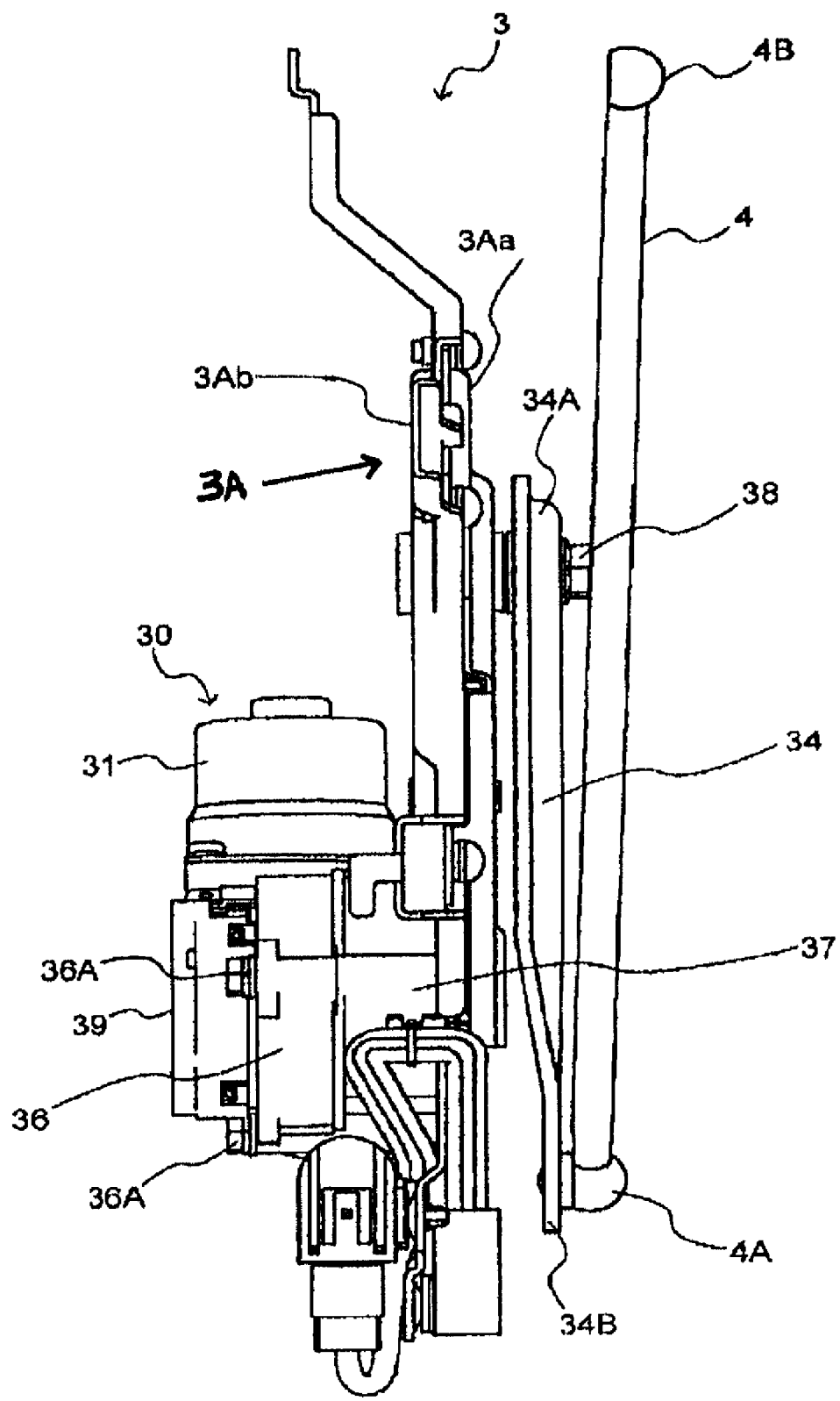
FIG. 14 is a side view of the door operating apparatus.
Figure 15:
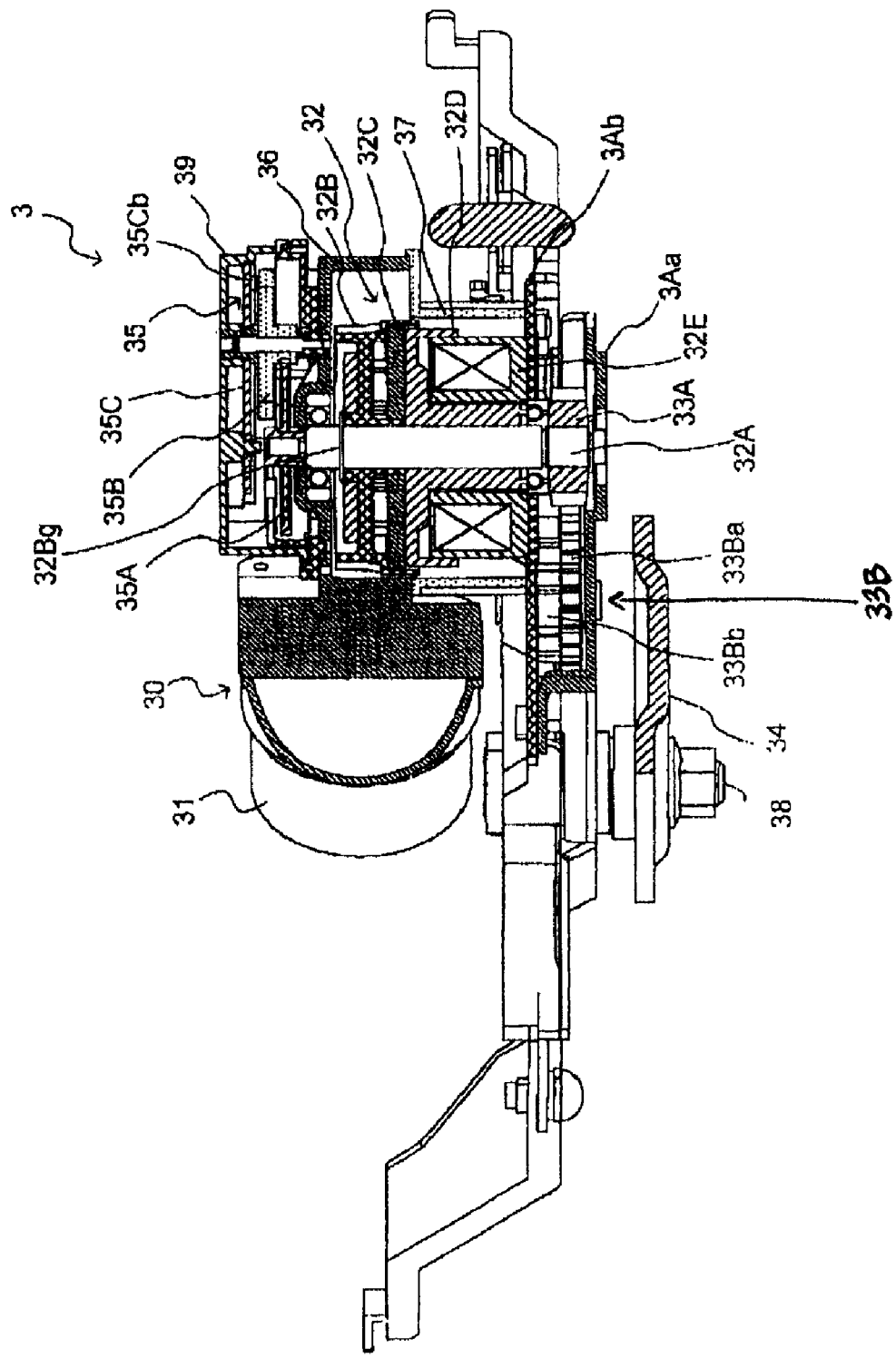
FIG. 15 is a cross-section of the door operating apparatus.
Figure 16:
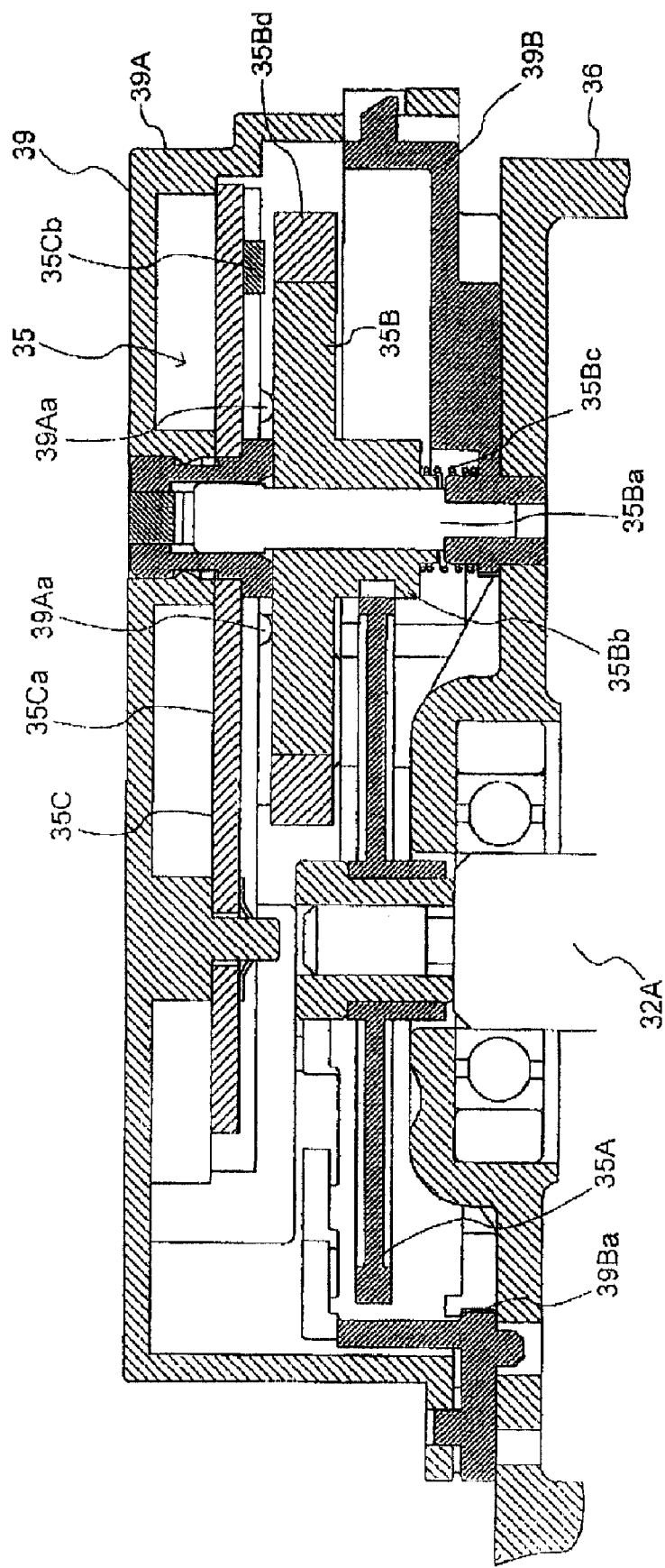
FIG. 16 is an enlarged cross-section of a rotary sensor.

FIG. 11 is a schematic view of a door operating apparatus according to a second embodiment of the present invention; FIG. 12 is a front view of the door operating apparatus; FIG. 13 is a rear view of the door operating apparatus; FIG. 14 is a side view of the door operating apparatus; FIG. 15 is a cross-section of the door operating apparatus; and FIG. 16 is an enlarged cross-section of a rotary sensor.

As shown in FIG. 11, a door operating apparatus 3 according to the present embodiment is mounted between a vehicle main body (a vehicle body) 1 of an automobile and a door (for example, a back door of a flip-up type) 2 serving as an operating member for closing an opening portion 1a formed in the vehicle main body 1, for operating the door 2. The door operating apparatus 3 is arranged via a transmission rod 4 serving as a transmission portion between a driving section 30 and the door 2. The door operating apparatus 3 transmits power of the driving section 30 to the door 2 via the transmission rod 4 to open and close the door 2.

As shown in FIGS. 12 to 15, the driving section 30 includes a driving motor 31 serving as a driving source, a clutch 32, a driving gear train 33, an arm, and a rotary sensor 35 in a casing 3A constituting an apparatus base portion of the door operating apparatus 3. The casing 3A is formed by fitting a front cover 3Aa and a rear cover 3Ab obtained by performing bending work on metal plates.

As shown in FIGS. 13 to 15, the driving motor 31 is mounted on the rear cover 3Ab outside the casing 3A. The driving motor 31 is disposed such that an output shaft (not shown) thereof is directed downwardly at an approximately central portion of the metal plate of the rear cover 3Ab. The output shaft of the driving motor 31 is provided with a worm gear 31A. The driving motor 31 has a motor base 36 made of metal (for example, aluminum alloy) in which the output shaft and the worm gear 31A are disposed. The motor base 36 is fixed to the rear cover 3Ab of the casing 3A by a bolt 36A.

As shown in FIG. 15, the clutch 32 is constituted as an electromagnetic clutch. The clutch 32 is provided in a clutch case 37 made of synthetic resin. The clutch case 37 is interposed between the motor base 36 and the rear cover 3Ab, and is fixed to the rear cover 3Ab together with the motor base 36.

The clutch 32 is constituted of a rotational shaft 32A, a worm wheel 32B, an armature 32C, a rotor 32D, and a coil portion 32E. The rotational shaft 32A is rotatably supported to the motor base 36 at one end thereof so as to be orthogonal to the output shaft of the driving motor 31, and the other end thereof is rotatably supported to the rear cover 3Ab of the casing 3A. The worm wheel 32B is rotatably fitted relative to the rotational shaft 32A and meshes with the worm gear 31A of the driving motor 31. The armature 32C is formed of a magnetic member in a disc shape, and is fitted to the rotational shaft 32A rotatably relative thereof. The armature 32C is provided in an engaging manner with the worm wheel 32B so as to move in an axial direction of the rotational shaft 32A and rotate integrally with the worm wheel 32B. The rotor 32D is fixed to the rotational shaft 32A so as to be opposed to the armature 32C. The coil portion 32E is disposed about the rotational shaft 32A to sandwich the rotor 32D between the armature 32C and the coil portion 32E. One end of the rotational shaft 32A extends from the motor base 36, and the other end thereof extends inside the casing 3A. Thus, the clutch 32 is disposed about the rotational shaft 32A.

In the clutch 32, when the coil portion 32E is excited, the armature 32C is attracted toward the coil portion 32E to engage the rotor 32D frictionally. Thus, a driving force of the driving motor 31 transmitted through the worm gear 31A and the worm wheel 32B is transmitted to the rotational shaft 32A via the rotor 32D so that the rotational shaft 32A is rotated. On the other hand, when excitation of the coil portion 32E is released, the armature 32C and the rotor 32D are separated from each other. Thus, relative transmission of power between the driving motor 31 and the rotational shaft 32A is cancelled.

As shown in FIG. 13, the driving gear train 33 is constituted of an output gear 33A, an intermediate gear 33B, and a driving gear 33C. The output gear 33A is fixed to the other end of the rotational shaft 32A inside the casing 3A. The intermediate gear 33B is supported inside the casing 3A, and is constituted of two gears 33Ba and 33Bb stacked on one another. One gear 33Ba meshes with the output gear 33A. The other gear 33Bb meshes with the driving gear 33C. The driving gear 33C is supported inside the casing 3A via a driving shaft 38. The driving gear 33C is fixed to the driving shaft 38 which extends toward the front face side of the casing 3A.

In the driving gear train 33, when a driving force of the driving motor 31 is transmitted to the rotational shaft 32A via the clutch 32, the driving shaft 38 is rotated according to rotation of the rotational shaft 32A via the output gear 33A, the one gear 33Ba of the intermediate gear 33B, the other gear 33Bb of the intermediate gear 33B, and the driving gear 33C.

As shown FIGS. 12, 14, and 15, a proximal end 34A of the arm 34 is fixed to the driving shaft 38 extending toward the front face side of the casing 3A. That is, the arm 34 is rotated according to rotation of the driving shaft 38. A rotational end 34B of the arm 34 is mounted with the transmission rod 4. As shown in FIGS. 11, 12, and 14, the transmission rod 4 is formed as an elongated rod, and one end 4A thereof is mounted on the rotational end 34B of the arm 34, and the other end 4B thereof is mounted on the door 2. The transmission rod 4 moves the door 2 in an opening direction of the door 2 or in a closing direction thereof according to rotation of the arm 34 of the driving section 30.

As shown in FIGS. 15 and 16, the rotary sensor 35 is attached inside a sensor case 39 made of synthetic resin and attached to the rear face side of the motor base 36. As shown in FIG. 16, the sensor case 39 is constituted of an upper case 39A and a lower case 39B formed separately from each other, and accommodates a sensor gear 35A, a magnet plate 35B, and a sensor section 35C constituting the rotary sensor 35 in an accommodating space defined by the upper case 39A and the lower case 39B.

The sensor gear 35A is fixed to one end portion of the rotational shaft 32A extending outside the motor base 36.

The magnet plate 35B has a supporting shaft 35Ba rotatably supported to the sensor case 39. The supporting shaft 35Ba has an upper end portion supported by the upper case 39A and a lower end portion supported by the lower case 39B. The supporting shaft 35Ba is provided with meshing teeth 35Bb meshing with the sensor gear 35A. As shown in FIG. 16, a compression spring 35Bc is interposed between a lower end portion of the supporting shaft 35Ba and the lower case 39B. That is, the magnet plate 35B is resiliently biased upwardly by the compression spring 35Bc. The magnet plate 35B has a permanent magnet 35Bd serving as a magnetic member extending in a radially outward direction of the supporting shaft 35Ba to be formed in a disc shape. The permanent magnet 35Bd is provided so as to constitute at least an outer peripheral portion of the disc shape portion extending in a radially outward direction of the supporting shaft 35Ba.

The sensor portion 35C has a sensor base plate 35Ca fixed to the upper case 39A. Two Hall elements (Hall IC) 35Cb are provided on a lower face of the sensor base plate 35Ca. The Hall elements 35Cb are respectively disposed to be opposed to a plate face (an upper face) of the permanent magnet 35Bd on the magnet plate 35B.

Supporting projections 39Aa are provided on an inner wall face of the upper case 39A. The supporting projections 39Aa abut on a disc-shaped portion of the magnet plate 35B resiliently biased by the compression spring 35Bc. Therefore, the permanent magnet 35Bd and the Hall elements 35Cb are disposed to be opposed to each other through a predetermined distance. The predetermined distance is a gap suitable for the Hall elements 35Cb to detect passage of magnetic flux of the permanent magnet 35Bd to output the same as a voltage. Thus, the compression spring 35Bc and the supporting projections 39Aa constitute a supporting unit that resiliently maintains the position of the permanent magnet 35Bd relative to the positions of the Hall elements 35Cb.

The rotary sensor 35 is provided with an opening hole 39Ba that permits passage of the sensor gear 35A to the lower case 39B. The sensor case 39 is fixed to an upper face of the motor base 36 by fixing screws 39C (see FIG. 13) so as to include the sensor gear 35A inserted therein via the opening hole 39Ba. At that time, the sensor gear 35A meshes with the meshing teeth 35Bb of the magnet plate 35B. In the rotary sensor 35, when a driving force of the driving motor 31 is transmitted to the rotational shaft 32A through the clutch 32, the sensor gear 35A rotates according to the rotation of the rotational shaft 32A. The magnet plate 35B is rotated according to the rotation of the sensor gear 35A, and the rotation is detected by the respective Hall elements 35Cb of the sensor portion 35C. The Hall elements 35Cb capture pulses with different phases. Thus, an opening or closing position, an opening or closing speed, and an opening or closing direction of the door 2 can be detected in the rotary sensor 35. Even when opening or closing of the door 2 is manually performed using the door operating apparatus 3, the rotational shaft 32A is rotated via the driving gear train 33 according to pivoting of the arm 34 and the magnet plate 35B is rotated. Thus, an opening or closing position, an opening or closing speed, and an opening or closing direction of the door 2 can be detected even when the door 2 is manually opened or closed. By detecting an opening or closing position, an opening or closing speed, and an opening or closing direction of the door 2 at a time of manual operation in this manner, a state of the door 2 can be recognized, for example, when the door 2 that has been opened manually is closed by the door operating apparatus 3. Besides, the state of the door 2 can be recognized even when the door 2 that has been manually opened or closed to an intermediate position between a fully opened position and a shut position is opened or closed by the door operating apparatus 3 in a following movement. Detection of the opening or closing position, the opening or closing speed, and the opening or closing direction of the door 2 can be used for reversion at a catching time of a foreign matter or for duty control (pulse width modulation (PWM) control).

In the door operating apparatus 3, therefore, the magnet plate 35B of the rotary sensor 35 has the permanent magnet 35Bd provided on one end side of the rotational shaft 32A and has the disc-shaped permanent magnet 35Bb rotated according to rotation of the rotational shaft 32A. The rotary sensor 35 has the Hall elements 35Cb disposed on the plate face of the permanent magnet 35Bd to be opposed to each other through the predetermined distance. Therefore, it is possible to dispose the magnet plate 35B and the Hall elements 35Cb at positions where they are not influenced by magnetic field when the coil portion 32E in the clutch 32 is excited. As a result, detection accuracy for the rotary sensor 35 can be improved.

The rotary sensor 35 has the Hall elements 35Cb disposed on the plate face of the permanent magnet 35Bd to be opposed to each other through the predetermined distance. Therefore, when the magnet plate 35B is rotated about the supporting shaft 35Ba, even when a rotational locus of the permanent magnet 35Bd fluctuates in a diametrically outward direction of the supporting shaft 35Ba, a relative distance between the permanent magnet 35Bd and the Hall elements 35Cb is not changed. As a result, detection accuracy for the rotary sensor 35 can be improved.

In the rotary sensor 35, the permanent magnet 35Bd and the Hall elements 35Cb are disposed and spaced by the predetermined distance owing to a resilient biasing force of the compression spring 35Bc. Therefore, a relative distance between the permanent magnet 35Bd and the Hall elements 35Cb is not changed with respect to the axial direction of the supporting shaft 35Ba. As a result, detection accuracy for the rotary sensor 35 can be improved.

The rotary sensor 35 is disposed on the one end side of the rotational shaft 32A extending outside the motor base 36 in the driving motor 31, and is accommodated in the sensor case 39 made of synthetic resin to be mounted on the motor base 36. Therefore, the motor base 36 made of metal for fixing the driving motor 31 to the casing 3A constituting the apparatus base portion for the door operating apparatus 3 can be reduced in size. As a result, the size and the weight of the door operating apparatus 3 can be reduced.

The rotary sensor 35 is disposed on the one end side of the rotational shaft 32A extending outside the motor base 36 in the driving motor 31, and is accommodated in the sensor case 39 made of synthetic resin to be mounted on the motor base 36. Therefore, it is possible to mount a controller (not shown) that controls the door operating apparatus 3 on the sensor base plate 35Ca accommodated in the sensor case 39. That is, the controller can be disposed among the constituent elements for the door operating apparatus 3 without increasing the size of the motor base 36 made of metal. As a result, it is possible to reduce the size and the weight of the door operating apparatus 3.

According to the second embodiment, the sensor gear 35A is provided on the one end portion of the rotational shaft 32A and the magnet plate 35B meshes with the sensor gear 35A, so that rotation of the rotational shaft 32A is obtained as rotation of the magnet plate 35B via the sensor gear 35A. Instead of such a constitution, the magnet plate 35B may be provided at the one end portion of the rotational shaft 32A.

Figure 17:
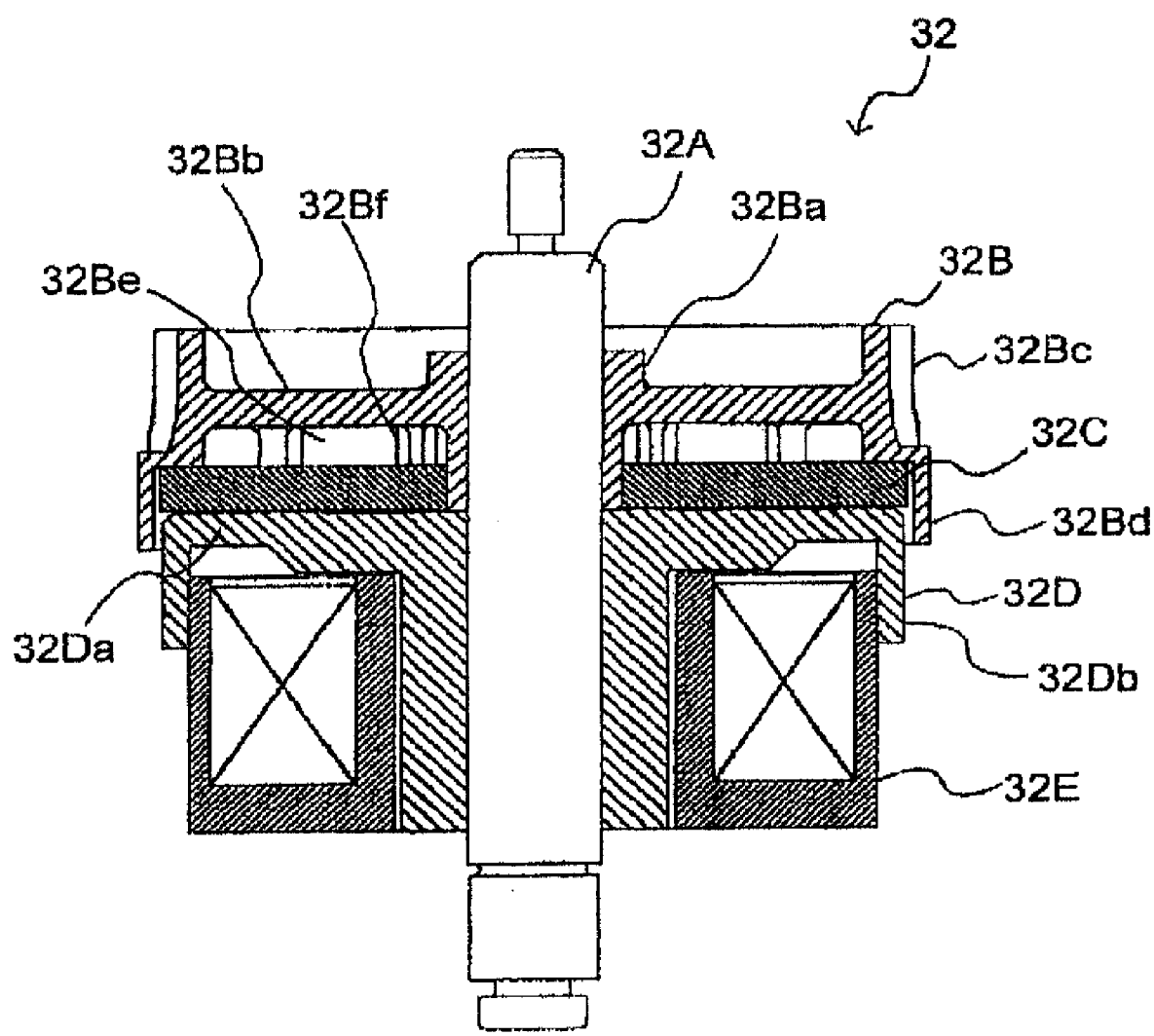
FIG. 17 is a cross-section of an electromagnetic clutch according to the present invention.
Figure 18:
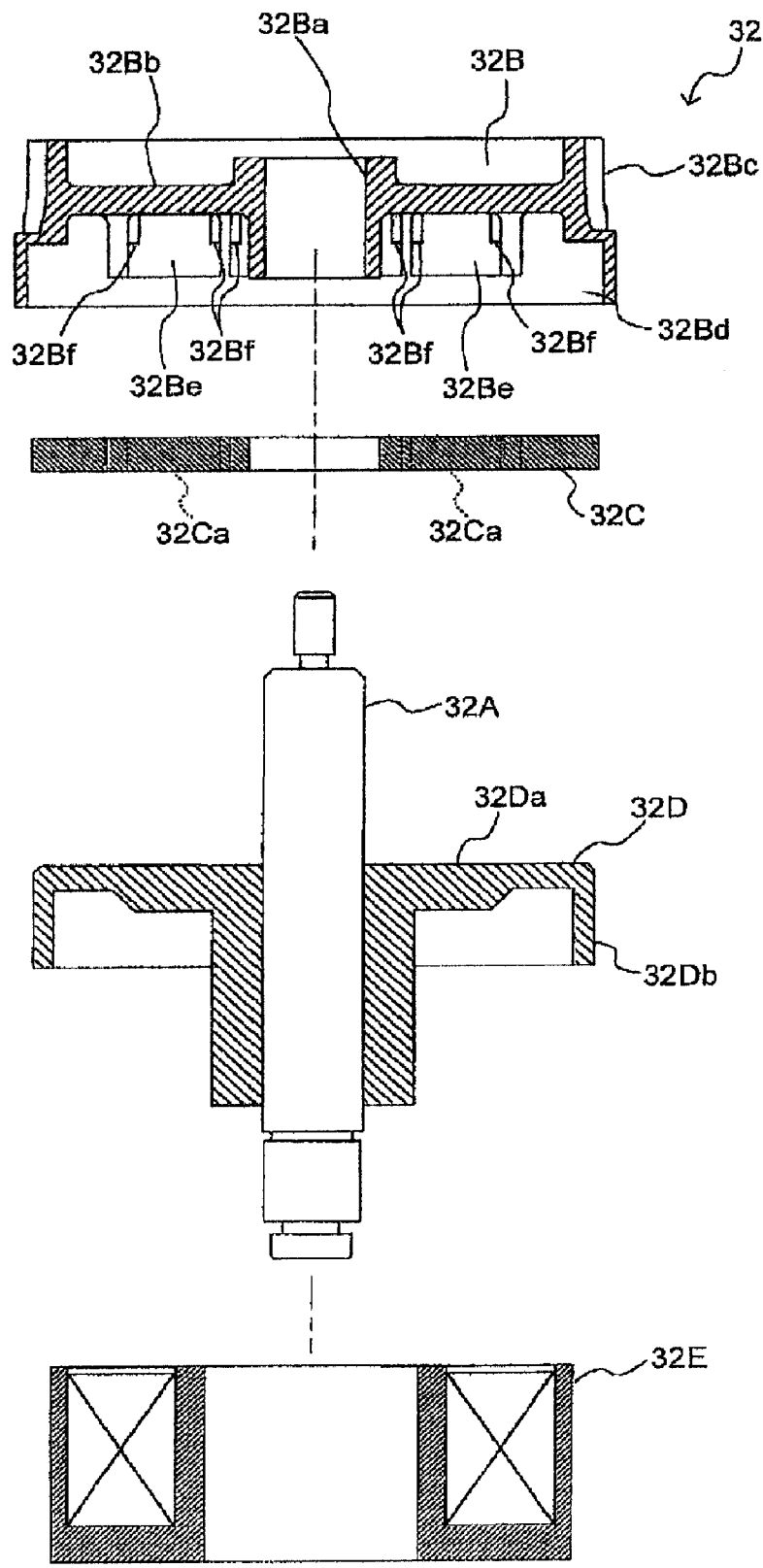
FIG. 18 is an exploded view of the electromagnetic clutch according to the present invention.

FIG. 17 is a cross-section of an electromagnetic clutch according to the present invention, and FIG. 18 is an exploded view of the electromagnetic clutch according to the present invention.

As shown in FIGS. 15, 17, and 18, the clutch 32 constituted as an electromagnetic clutch has a clutch shaft 32A that is a rotational shaft described above, the worm wheel 32B serving as the transmission gear, the armature 32C serving as the magnetic member, the rotor 32D serving as the rotational portion, and the coil portion 32E.

One end side of the clutch shaft 32A is rotatably supported to the motor base 36 such that the clutch shaft 32A is orthogonal to the output shaft of the driving motor 31, and the other end side thereof is rotatably supported to the rear face cover 3Ab of the casing 3A. One end of the clutch shaft 32A extends from the motor base 36, while the other end thereof extends into the casing 3A.

The worm wheel 32B is fitted on the clutch shaft 32A rotatably relative thereto and meshes with the worm gear 31A of the driving motor 31. As shown in FIGS. 17 and 18, the worm wheel 32B has a cylindrical portion 32Ba inserted with the clutch shaft 32A. The worm wheel 32B has a disc-like frame 32Bb at an outer periphery of an approximately central portion of the cylindrical portion 32Ba, and is formed at an outer periphery of the frame 32Bb with meshing teeth 32Bc meshing with the worm gear 31A. A cover member 32Bd provided annularly to extend along the axial direction of the clutch shaft 32A and to cover the cylindrical portion 32Ba inward is formed below the meshing teeth 32Bc. Engagement projections 32Be extend from a lower side of the frame 32Bb covered with the cover member 32Bd. A proximal end portion of each engagement projection 32Be extending from the frame 32Bb is formed with step portions 32Bf. As shown in FIG. 15, a sealing member 32Bg that closes a clearance between the cylindrical hole of the cylindrical portion 32Ba and the clutch shaft 32A is provided at an upper end of the cylindrical portion 32Ba of the worm wheel 32B.

The armature 32C is formed of a magnetic material in a disc shape and is fitted rotatably relative to the clutch shaft 32A. The armature 32C is engaged with the warm wheel 32B so as to move in the direction of the axial line of the clutch shaft 32A and to rotate integrally with the worm wheel 32B. Specifically, as shown in FIG. 18, the armature 32C includes engagement holes 32Ca in which the engagement projections 32Be of the worm wheel 32B are inserted. The armature 32C is caused to be engaged with the worm wheel 32B by inserting the engagement projections 32Be into the engagement holes 32Ca to be rotated integrally with the worm wheel 32B. The armature 32C is provided to be movable in the axial direction (upwardly) of the clutch shaft 32A until its upper face abuts on the step portions 32Bf and to be movable in the axial direction (downwardly) of the clutch shaft 32A until its lower face abuts on an upper face of the rotor 32D. The armature 32C is disposed inside the cover member 32Bd of the worm wheel 32B.

The rotor 32D is fixed to the clutch shaft 32A, and has an abutting portion 32Da formed in a disc shape at its upper portion. An upper face of the abutting portion 32Da faces a lower face of the armature 32C. An edge piece 32Db extending downwardly is provided on an outer periphery of the abutting portion 32Da. An outside portion of the edge piece is covered with the cover member 32Bd of the worm wheel 32B.

The coil portion 32E is disposed about the clutch shaft 32A, and an upper portion thereof is covered with the edge piece 32Db of the rotor 32D. The coil portion 32E is provided so as to sandwich the rotor 32D between the coil portion 32E and the armature 32C.

In the clutch 32, when the coil portion 32E is excited, the armature 32C is attracted toward the coil portion 32E to be engaged with the rotor 32D frictionally. Thus, a driving force of the driving motor 31 transmitted via the worm gear 31A and the worm wheel 32B is transmitted to the clutch shaft 32A via the rotor 32D so that the clutch shaft 32A is rotated. On the other hand, when excitation of the coil portion 32E is released, the armature 32C and the rotor 32D are separated from each other. Thus, relative transmission of power between the driving motor 31 and the clutch shaft 32A is cancelled.

Regarding the clutch 32, a meshing portion of the meshing teeth 32Bc of the worm wheel 32B and the worm gear 31A is filled with grease for making the meshing therebetween smooth. The grease may be fluidized to flow from the worm wheel 32B to another portion. In this case, the cover member 32Bd is formed below the meshing teeth 32Bc in the present embodiment. The cover member 32Bd covers an outer portion of the rotor 32D, while including the armature 32C therein. That is, the cover member 32Bd and the outer portion of the rotor 32D overlap with each other. Namely, the fluidized grease is prevented from reaching the frictional engaging portion of the armature 32C and the rotor 32D by the cover member 32Bd. As a result, it is possible to prevent grease from entering in between the armature and the rotor securely. Since the cover member 32Bd is formed integrally with the worm wheel 32B, it is possible to assemble the clutch 32 easily.

A clearance between the cylindrical hole of the cylindrical portion 32Ba of the worm wheel 32B and the clutch shaft 32A is sealed by the sealing member 32Bg. Therefore, grease for a bearing that rotatably supports one end side of the clutch shaft 32A to the motor base 36 is prevented from flowing on the clutch shaft 32A to reach the frictional engaging portion of the armature 32C and the rotor 32D. As a result, it is possible to prevent grease from entering in between the armature and the rotor securely. Since the sealing member 32Bg is provided, even if grease filled in the meshing portion of the meshing teeth 32Bc of the worm wheel 32B and the worm gear 31A flows upwardly in FIG. 15, it is prevented from flowing on the clutch shaft 32A to reach the frictional engaging portion of the armature 32C and the rotor 32D. As a result, it is possible to prevent grease from entering in between the armature and the rotor securely.

The upper portion of the coil portion 32E is covered with the edge piece 32Db of the rotor 32D. Thus, fluidized grease is prevented from entering in between the rotor 32D and the coil portion 32E and reaching the frictional engaging portion of the armature 32C and the rotor 32D therefrom. As a result, it is possible to prevent grease from entering in between the armature and the rotor securely.

Figure 19:
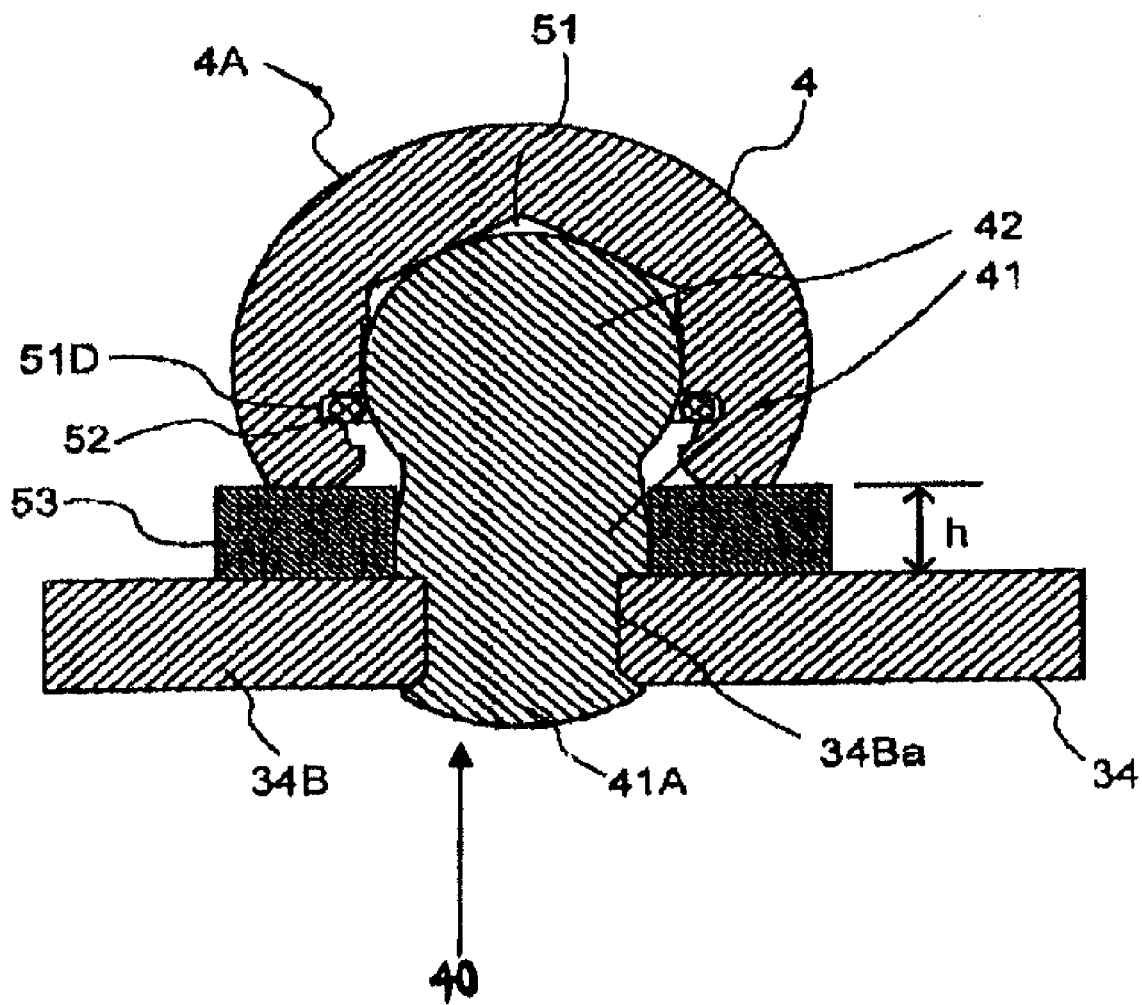
FIG. 19 is a cross-section of a coupling mechanism according to the present invention.
Figure 20:
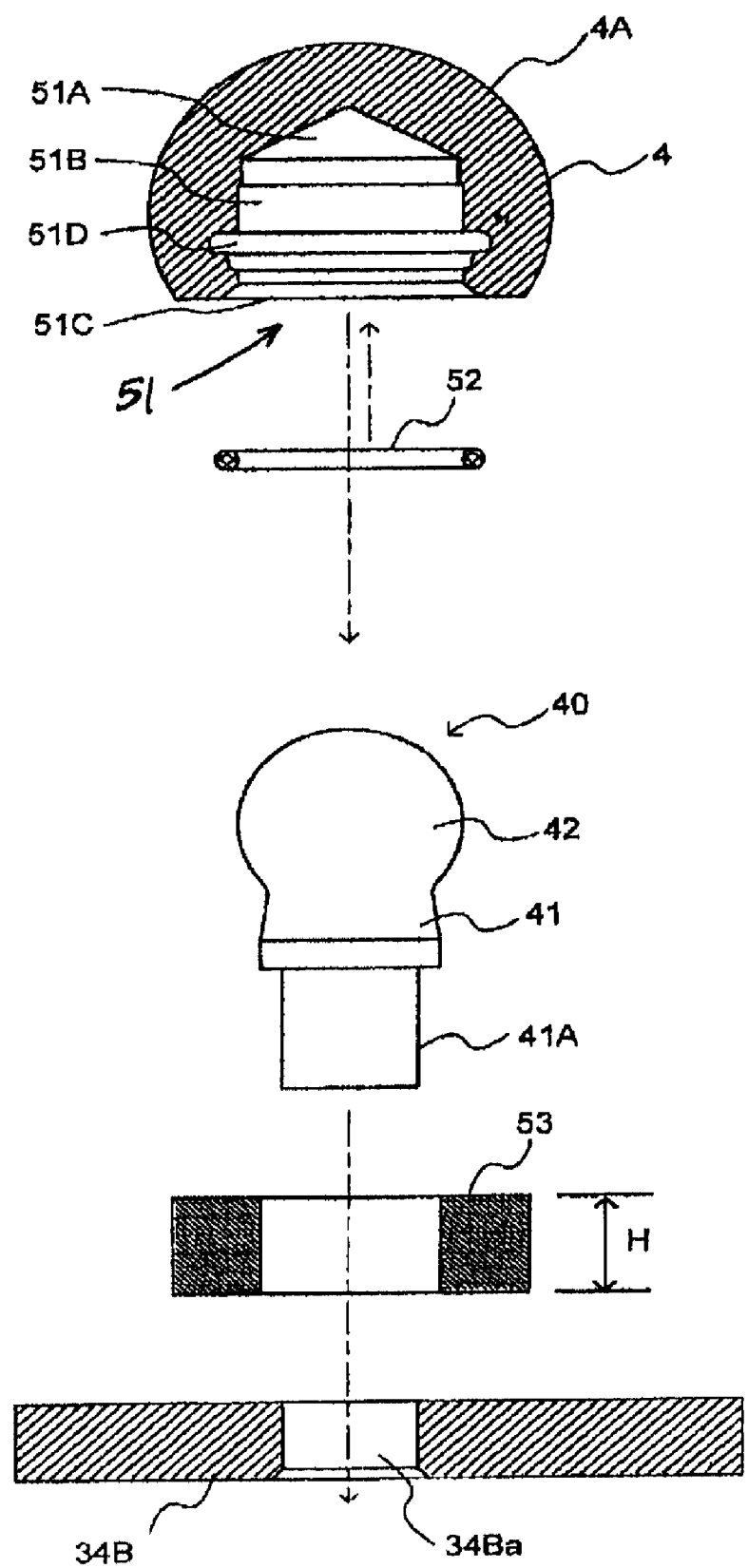
FIG. 20 is an exploded view of the coupling mechanism according to the present invention.

FIG. 19 is a cross-section of a coupling mechanism according to the present invention, and FIG. 20 is an exploded view of the coupling mechanism according to the present invention.

The coupling mechanism according to the present embodiment is for mounting the transmission rod 4 to the arm 34 and the door 2. FIGS. 19 and 20 depict a coupling mechanism for coupling the transmission rod 4 serving as the transmission portion to the arm 34 serving as the driving section 30. Similarly, the coupling mechanism according to the present embodiment is applied to a coupling mechanism for coupling the transmission rod 4 serving as the transmission portion to the door 2 serving as an operating member.

As shown in FIG. 19, in the coupling mechanism, a second member is fitted to a first member. The first member corresponds to a side of the rotational end 34B of the arm 34 (or the door 2) and the second member corresponds to a side of the one end 4A (or the other end 4B) of the transmission rod 4.

As shown in FIGS. 19 and 20, a shaft member 40 is fixed to the first member (the rotational end 34B (or the door 2) of the arm 34). The shaft member 40 includes a shaft portion 41 and a head portion 42. The shaft portion 41 is provided with a fixing portion 41A that is inserted into a fixing hole 34Ba provided in the rotational end 34B of the arm 34 serving as the first member to be fixed. The shaft member 40 is fixed to the arm 34 by, after inserting the fixing portion 41A into the fixing hole 34Ba, caulking a portion of the fixing portion 41A that extends from the fixing hole 34Ba. Although not shown, the fixing portion 41A may include a male screw and the shaft member 40 can be fixed to the arm 34 by a nut. Furthermore, although not shown, the fixing portion 41A may include a female screw and the shaft member 40 can be fixed to the arm 34 by a bolt. The shaft portion 41 is fixed to the arm 34 to extend in the axial direction. The head portion 42 is provided at a distal end of the shaft portion 41 extending from the arm 34 integrally with the shaft portion 41. The head portion 42 is formed in a spherical shape.

As shown in FIGS. 19 and 20, the second member (the one end 4A (or the other end 4B) of the transmission rod 4) has an outer diameter obtained by cutting a sphere partially to form a flat face portion and is provided at the flat face portion with a recessed portion 51. The recessed portion 51 is for holding the head portion 42 of the shaft member 40, and is formed such that a depth portion 51A thereof is formed in a substantially conical recess, a central portion 51B thereof is formed in a cylindrical hole having a diameter that permits insertion of the head portion 42 of the shaft member 40 with a slight clearance, and an opening portion 51C is formed to have an opening diameter that permits insertion of the head portion 42 with a play. A circumferential groove 51D fitted with a ring 52 made of a spring material is formed in a portion of the recessed portion 51 that is positioned between the central portion 51B and the opening portion 51C and corresponds to a portion of the shaft member 40 where the diameter of the head portion 42 inserted decreases toward the shaft portion 41 (the opening portion 51C). The ring 52 is formed in an annular shape partially cut off and has elasticity in expanding and retracting directions of the annular shape. When the head portion 42 of the shaft member 40 is inserted into the recessed portion 51, the ring 52 is engaged with the circumferential groove 51D and the head portion 42 to serve as a retaining member that prevents the head portion 42 from coming off from the recessed portion 51. Lubricant is filled in the recessed portion 51 inserted with the head portion 42.

A spacer 53 is interposed between the first member and the second member. The spacer 53 is made of an elastic material such as rubber or flexible resin, and is formed in an annular shape. The spacer 53 has a thickness H as shown in FIG. 20 as a single unit. The spacer 53 is pressed and flexed in the axial direction of the shaft portion 41 to generate an elastic force due to a small spacing h between the first member (a face of the arm 34 (or the door 2) from which the shaft member 40 extends) and the second member (a portion of the transmission rod 4 having the opening portion 51C), when the head portion 42 of the shaft member 40 is inserted up to the depth portion 51A of the recessed portion 51. That is, the spacer 53 generates an elastic force in a direction in which the first member and the second member are separated from each other in the axial direction of the shaft portion 41.

When the space 53 is pressed to flex in a thickness direction thereof to the axial direction of the shaft portion 41, an annular inner diametrical portion thereof comes in tight contact with a circumferential face of the shaft portion 41 of the shaft member 40. The spacer 53 is formed such that an annular outer diameter is larger than an opening diameter of the opening portion 51C of the recessed portion 51. That is, the spacer 53 closes the opening portion 51C of the recessed portion 51.

The coupling mechanism thus constituted holds the head portion 42 of the shaft member 40 in the recessed portion 51 to constitute a so-called ball joint. That is, the coupling mechanism permits a relative rotational movement between the head portion 42 and the recessed portion 51 about the axial line of the shaft portion 41 along the spherical shape of the head portion 42 and permits relative movement therebetween inclining to the axial line.

In the coupling mechanism, therefore, the first member (the rotational end 34B of the arm 34 (or the door 2)) and the second member (the one end 4A (or the other end 4B) of the transmission rod 4) are held so as to be spaced from each other in the axial direction of the shaft portion 41 owing to an elastic force of the spacer 53. Thus, even if a relative movement between the head portion 42 and the recessed portion 51 inclining to the axial line of the shaft portion 41 along the spherical shape of the head portion 42 occurs, the first member and the second member are prevented from coming in contact with each other within an allowable range of operating of the door 2. Especially, the spacer 53 generates an elastic force in a direction in which the first member and the second member are always separated from each other. Therefore, since a play in fitting between the head portion 42 and the recessed portion 51 is received and absorbed, it is possible to prevent the sudden movement of the door 2 to swing due to displacement of load acting at an opening or closing time of the door 2. As a result, movement of the door 2 can be transmitted smoothly via the transmission rod.

The spacer 53 closes the opening portion 51C of the recessed portion 51. Thus, the opening portion 51C of the recessed portion 51 is shielded from the outside. That is, it is possible to prevent powder dust from entering from the opening portion 51C into the recessed portion 51. It is also possible to prevent leakage of lubricant filled in the recessed portion 51 from the opening portion 51C.

The present invention has been described with characteristic embodiments in order to disclose the invention in a complete and clear manner. However, the appended claims should not be limited by the above embodiments, and should embody full range of modifications and replaceable configurations that can be conceived by persons skilled in the art, within the scope of fundamental features described in the present specification.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle backdoor operating apparatus, comprising:
   a motor bracket that covers a driving shaft of a driving motor, and holds the driving motor to a supporting bracket;
   an output shaft that is disposed from the motor bracket toward the supporting bracket so as to be orthogonal to an extending direction of the driving shaft;
   a first rotational element that is linked with the driving shaft of the driving motor, and disposed on the output shaft and disposed within the motor bracket;
   a second rotational element disposed between the first rotational element and the supporting bracket on the output shaft;
   a clutch unit including a clutch driving section that supports a rotation of the output shaft, wherein the clutch driving section is mounted to and held by the supporting bracket, wherein
   when the first rotational element and the second rotational element are engaged by driving of the clutch driving section, a swing arm is actuated by the driving force of the driving motor,
   a coupling mechanism comprising:
      a first member including a head portion in a spherical shape,
      a second member including a recessed portion that fits with the head portion, and
      a spacer that is provided between the first member and the second member, and generates an elastic force so that the first member and the second member are separated from each other,
   wherein the coupling mechanism rotatably connects one end of the swing arm to one end of a rod which is connected to a backdoor of a vehicle, so that actuation of the swing arm by the driving motor causes the rod to open or close the backdoor of the vehicle via the coupling mechanism.

2. The vehicle backdoor operating apparatus according to claim 1, wherein the driving motor is held within a surface projection area of the supporting bracket.

3. The vehicle backdoor operating apparatus according to claim 1, further comprising a column-shaped member that couples the motor bracket and the supporting bracket with a clearance secured between the motor bracket and the supporting bracket, wherein
   a constituent element positioned between the motor bracket and the supporting bracket is covered with a cover member made of resin.

4. The vehicle backdoor operating apparatus according to claim 3, wherein the column-shaped member is provided integrally from the motor bracket to the supporting bracket in a projecting manner.

5. A vehicle backdoor operating apparatus comprising:
   an electromagnetic clutch that is disposed around a rotational shaft, and transmits a driving force of a driving motor to the rotational shaft;
   a rotary sensor disposed near an end portion of the rotational shaft that detects the rotating state of the rotational shaft, wherein the rotary sensor includes a sensor gear, a magnet disc plate having a magnetic strip, and a Hall element;
   wherein the sensor gear is provided at an end portion of the rotational shaft so that an axial center of the sensor gear and an axial center of the rotational shaft coincide,
   wherein the magnet disc plate is rotationally driven according to rotation of the sensor gear and an axial center of the magnet disc plate does not coincide with the sensor gear, and
   wherein the Hall element faces the magnetic strip of the magnetic disc;
   a swing arm that is actuated by the driving force of the driving motor; and
   a coupling mechanism comprising:
      a first member including a head portion in a spherical shape,
      a second member including a recessed portion that fits with the head portion, and
      a spacer that is provided between the first member and the second member, and generates an elastic force such that the first member and the second member are separated from each other,
   wherein the coupling mechanism rotatably connects one end of the swing arm to one end of a rod which is connected to a backdoor of a vehicle, so that actuation of the swing arm by the driving motor causes the rod to open or close the backdoor of the vehicle via the coupling mechanism.

6. The vehicle backdoor operating apparatus according to claim 5, further comprising a supporting unit that elastically supports a position of the magnetic disc with respect to a position of the Hall element.

7. The vehicle backdoor operating apparatus according to claim 5, further comprising:
   a motor base that fixes the driving motor to a base portion of the door operating apparatus; and
   a sensor case that encloses the rotary sensor,
   wherein the sensor case is attached to the motor base such that an end portion of the rotational shaft extends outside the motor base, and the rotary sensor is disposed on a side of the end portion of the rotational shaft.

* * * * *